US010031218B2

(12) United States Patent
Min et al.

(10) Patent No.: US 10,031,218 B2
(45) Date of Patent: Jul. 24, 2018

(54) METHOD AND APPARATUS FOR SENSING FINGERPRINTS

(71) Applicant: Samsung Electronics Co., Ltd., Gyeonggi-do (KR)

(72) Inventors: Ki Hong Min, Seoul (KR); Jong-Seok Kim, Gyeonggi-do (KR); Jeong-Min Park, Gyeonggi-do (KR); Dohyoung Chung, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/076,969

(22) Filed: Mar. 22, 2016

(65) Prior Publication Data

US 2016/0313439 A1  Oct. 27, 2016

(30) Foreign Application Priority Data

Apr. 21, 2015  (KR) ................ 10-2015-0055934

(51) Int. Cl.
*G01S 7/539* (2006.01)
*G06K 9/00* (2006.01)

(52) U.S. Cl.
CPC ............ *G01S 7/539* (2013.01); *G06K 9/0002* (2013.01); *G06K 9/00107* (2013.01); *G06K 2009/00932* (2013.01)

(58) Field of Classification Search
CPC .............. G01S 7/539; G06K 2009/00932
USPC .................................. 367/93, 539
See application file for complete search history.

(56) References Cited

U.S. PATENT DOCUMENTS

| | | | |
|---|---|---|---|
| 6,928,181 B2 * | 8/2005 | Brooks | G06K 9/00 340/5.82 |
| 7,739,912 B2 | 6/2010 | Schneider et al. | |
| 8,601,876 B2 | 12/2013 | Schneider et al. | |
| 8,724,859 B2 | 5/2014 | Schneider et al. | |
| 2014/0090473 A1 | 4/2014 | Schneider et al. | |
| 2014/0185885 A1 * | 7/2014 | Yamada | G06K 9/00892 382/124 |
| 2014/0219521 A1 * | 8/2014 | Schmitt | G06K 9/0002 382/124 |
| 2015/0198699 A1 * | 7/2015 | Kuo | G01S 7/52017 367/7 |

FOREIGN PATENT DOCUMENTS

| | | |
|---|---|---|
| JP | 2005-242593 A | 9/2005 |
| WO | 2015/009635 A1 | 1/2015 |

OTHER PUBLICATIONS

Nixon, et al.; "Spoof Detection Schemes"; Handbook of Biometrics; 2007; Springer; XP055309969.
European Search Report; dated Oct. 25, 2016.

\* cited by examiner

*Primary Examiner* — Qutbuddin Ghulamali
(74) *Attorney, Agent, or Firm* — Cha & Reiter, LLC

(57) ABSTRACT

A method for sensing a fingerprint, comprising: receiving, by an electronic device, a sound wave signal that is reflected from an object; detecting at least one echo signal that is associated with the object for each reception period in a plurality of reception periods, wherein the at least one echo signal is detected based on the sound wave signal; and detecting the fingerprint based on the at least one echo signal.

18 Claims, 19 Drawing Sheets

METHOD AND APPARATUS FOR SENSING FINGERPRINTS

CLAIM OF PRIORITY

This application claims the benefit under 35 U.S.C. § 119(a) of a Korean patent application filed in the Korean Intellectual Property Office on Apr. 21, 2015 and assigned Serial No. 10-2015-0055934, the entire disclosure of which is hereby incorporated by reference.

BACKGROUND

1. Field of the Disclosure

The present disclosure relates to electronic devices, in general, and more particularly to a method and apparatus for sensing fingerprints.

2. Description of the Related Art

At present, an electronic device such as a smart phone or a tablet Personal Computer (PC) has been popularized, and the use of the smart phone which utilizes a fingerprint sensor is more and more increased in recent years. The fingerprint sensor used in the smart phone is used more frequently than before due to easy usage and high security.

However, with an increase in usability and popularity of the fingerprint, people tend to store or confirm personal information through fingerprint authentication, and if the fingerprint is not supported, its damage may be significant. Since the fingerprint has relatively high security, a dependency of users is increased, and thus an effort for hacking this is also increased. Therefore, a fingerprint recognition technique having a higher level of security is necessary.

However, the fingerprint sensor must improve security in a state of not damaging usability. In most cases, the fingerprint sensor performs a confirmation in general by normalizing and imaging a portion in which a difference between a ridge and valley of a finger is generated in a process of emitting and receiving light, electrodes, sound, or the like.

Conventionally, user authentication is achieved through an algorithm which recognizes only a shape of the fingerprint by the use of a difference of reflection coefficients of the ridge and the valley in the fingerprint sensor or a difference of electrical signal strength.

However, in this method, when a fingerprint is created with other materials by copying a fingerprint of a user and thereafter is coated with a material having a permittivity similar to a human tissue, a fake fingerprint cannot be distinguished from that of a real user, which results in being vulnerable to security. For example, a sound wave impedance of human skin is 1.63, and a sound wave impedance of a material such rubber is 1.3 which may be similar to the sound wave impedance of a human skin tissue.

SUMMARY

According to aspects of the disclosure, a method is provided for sensing a fingerprint, comprising: receiving, by an electronic device, a sound wave signal that is reflected from an object; detecting at least one echo signal that is associated with the object for each reception period in a plurality of reception periods, wherein the at least one echo signal is detected based on the sound wave signal; and detecting the fingerprint based on the at least one echo signal.

According to aspects of the disclosure, an apparatus is provided for sensing a fingerprint comprising: a fingerprint sensor; a memory; and at least one processor operatively coupled to the memory, configured to: receive, via the fingerprint sensor, at least one sound wave signal that is reflected from an object; detect at least one echo signal that is associated with the object for each reception period in a plurality of reception periods, wherein the at least one echo signal is detected based on the sound wave signal; and detect the fingerprint based on the at least one echo signal.

DETAILED DESCRIPTION

Figure 1:
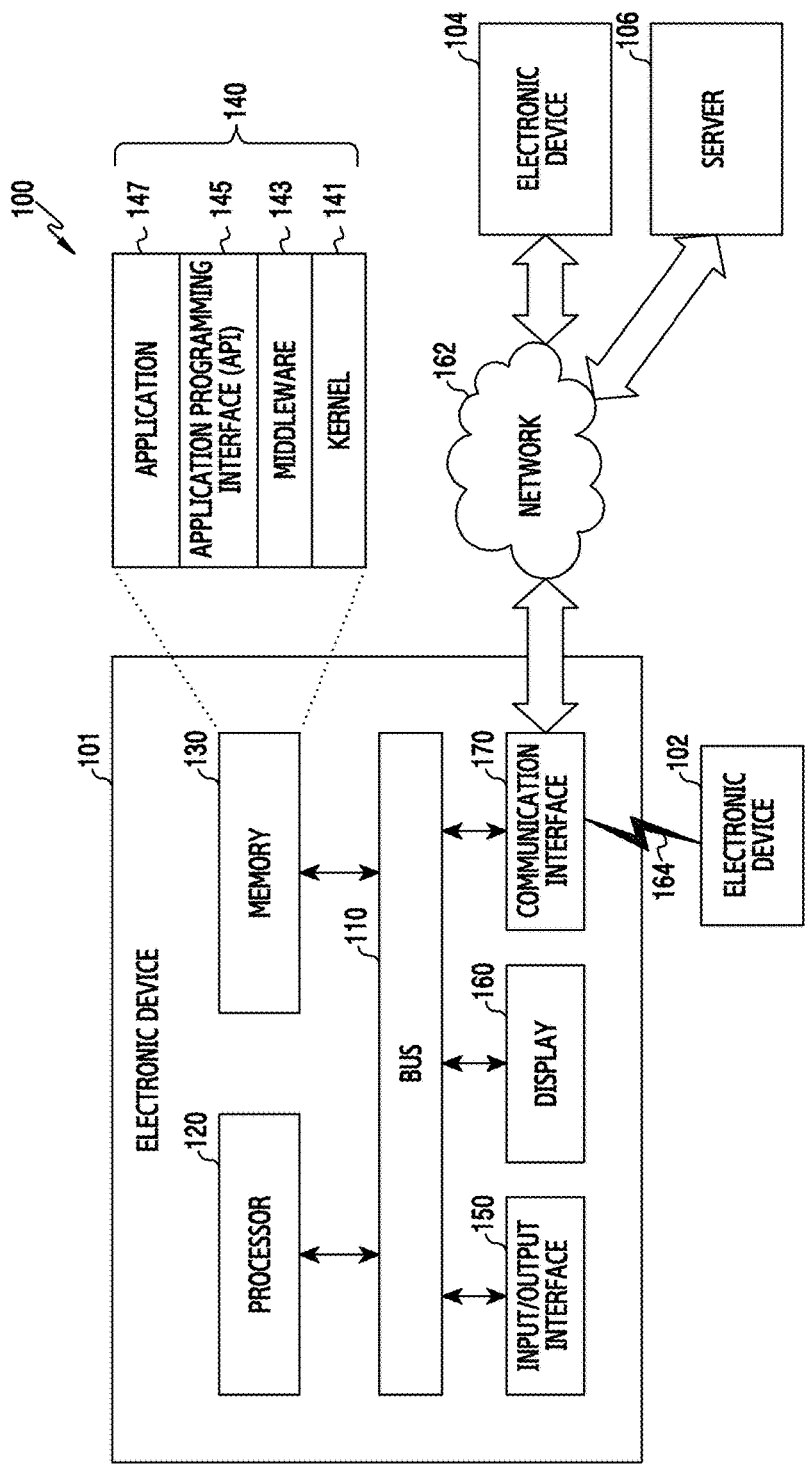
FIG. 1 is a diagram of an example of a network environment, according to various embodiments.

Hereinafter, various embodiments of the present disclosure will be described in connection with the accompanying drawings.

The present disclosure may have various embodiments, and modifications and changes may be made therein. Therefore, the present disclosure will be described in detail with reference to particular embodiments shown in the accompanying drawings. However, it should be understood that the present disclosure is not limited to the particular embodiments, but includes all modifications, equivalents, and/or alternatives within the spirit and scope of the present disclosure. In the description of the drawings, similar reference numerals may be used to designate similar elements.

As used in various embodiments of the present disclosure, the expressions "include", "may include" and other conjugates refer to the existence of a corresponding disclosed function, operation, or constituent element, and do not limit one or more additional functions, operations, or constituent elements. Further, as used in various embodiments of the present disclosure, the terms "include", "have", and their conjugates are intended merely to denote a certain feature, numeral, step, operation, element, component, or a combination thereof, and should not be construed to initially exclude the existence of or a possibility of addition of one or more other features, numerals, steps, operations, elements, components, or combinations thereof In various embodiments of the present disclosure, the expression "or" or "at least one of A or/and B" includes any or all of combinations of words listed together. For example, the expression "A or B" or "at least A or/and B" may include A, may include B, or may include both A and B.

In the present disclosure, expressions including ordinal numbers, such as "first" and "second," etc., may modify various elements. However, such elements are not limited by the above expressions. For example, the above expressions do not limit the sequence and/or importance of the elements. The above expressions are used merely for the purpose of distinguishing an element from the other elements. For example, a first user device and a second user device indicate different user devices although both of them are user devices. For example, a first element may be termed a second element, and likewise a second element may also be termed a first element without departing from the scope of various embodiments of the present disclosure.

When an element is referred to as being "coupled" or "connected" to any other element, it should be understood that not only the element may be coupled or connected directly to the other element, but also a third element may be interposed therebetween. Contrarily, when an element is referred to as being "directly coupled" or "directly connected" to any other element, it should be understood that no element is interposed therebetween.

The terms as used in various embodiments of the present disclosure are used merely to describe a certain embodiment and are not intended to limit the present disclosure. As used herein, singular forms may include plural forms as well unless the context explicitly indicates otherwise. Furthermore, all terms used herein, including technical and scientific terms, have the same meaning as commonly understood by those of skill in the art to which the present disclosure pertains. Such terms as those defined in a generally used dictionary are to be interpreted to have the meanings equal to the contextual meanings in the relevant field of art, and are not to be interpreted to have ideal or excessively formal meanings unless clearly defined in various embodiments of the present disclosure.

An electronic device according to various embodiments of the present disclosure may be a device including a communication function. For example, the electronic device may include at least one of a Smartphone, a Tablet Personal Computer (PC), a Mobile Phone, a Video Phone, an Electronic Book (e-book) reader, a Desktop PC, a Laptop PC, a Netbook Computer, a Personal Digital Assistant (PDA), a Portable Multimedia Player (PMP), an MP3 player, a Mobile Medical Appliance, a Camera, and a Wearable Device (e.g. a Head-Mounted-Device (HMD) such as electronic glasses, electronic clothes, an electronic bracelet, an electronic necklace, an electronic appcessory, electronic tattoos, or a smartwatch).

According to some embodiments, the electronic device may be a smart home appliance with a communication function. For example, the smart home appliance may include at least one of a television, a digital video disk (DVD) player, an audio, a refrigerator, an air conditioner, a vacuum cleaner, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, and an electronic photo frame.

According to some embodiments, the electronic device may include at least one of various medical appliances (e.g., magnetic resonance angiography (MRA), magnetic resonance imaging (MRI), computed tomography (CT), and ultrasonic machines), navigation equipment, a global positioning system (GPS) receiver, an event data recorder (EDR), a flight data recorder (FDR), automotive infotainment device, electronic equipment for ships (e.g., ship navigation equipment and a gyrocompass), avionics, security equipment, a vehicle head unit, an industrial or home robot, an automatic teller machine (ATM) of a banking system, and a point of sales (POS) of a shop.

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter).

The electronic device according to various embodiments of the present disclosure may be a combination of one or more of the aforementioned various devices.

Further, the electronic device according to various embodiments of the present disclosure may be a flexible device. Further, it will be apparent to those skilled in the art that the electronic device according to various embodiments of the present disclosure is not limited to the aforementioned devices.

Hereinafter, an electronic device according to various embodiments of the present disclosure will be described with reference to the accompanying drawings. The term "user" as used in various embodiments of the present disclosure may indicate a person who uses an electronic device or a device (e.g., artificial intelligence electronic device) that uses an electronic device.

FIG. 1 is a diagram of an example of a network environment, according to various embodiments.

Referring to FIG. 1, an electronic device 101 may include at least one of a bus 110, a processor 120, a memory 130, an input/output interface 150, a display 160, and a communication interface 170. According to various embodiments of the present disclosure, at least one of the components of the electronic device 101 may be omitted, or other components may be additionally included in the electronic device 101.

The bus 110 may be a circuit that interconnects the aforementioned elements and transmits communication signals (e.g., control messages) between the aforementioned elements.

The processor 120 may include any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), etc. In operation, the processor 120 may carry out operations or data processing related to control and/or communication of at least one other component (for example, the memory 130, the input/output interface 150, the display 160, or the communication interface 170) of the electronic device 101.

The memory 130 may include any suitable type of volatile or non-volatile memory, such as Random-access Memory (RAM), Read-Only Memory (ROM), Network Accessible Storage (NAS), cloud storage, a Solid State Drive (SSD), etc. In operation, the memory 130 may store commands or data (e.g., a reference pattern or a reference touch area) associated with one or more other components of the electronic device 101. According to one embodiment, the memory 130 may store software and/or a program 140. For example, the program 140 may include a kernel 141, a middleware 143, an API (Application Programming Interface) 145, an application program 147, or the like. At least some of the kernel 141, the middleware 143, and the API 145 may be referred to as an OS (Operating System).

The kernel 141 may control or manage system resources (e.g., the bus 110, the processor 120, or the memory 130) used for performing an operation or function implemented by the other programs (e.g., the middleware 143, the API 145, or the applications 147). Furthermore, the kernel 141 may provide an interface through which the middleware 143, the API 145, or the applications 147 may access the individual elements of the electronic device 101 to control or manage the system resources.

The middleware 143, for example, may function as an intermediary for allowing the API 145 or the applications 147 to communicate with the kernel 141 to exchange data. In addition, the middleware 143 may process one or more task requests received from the applications 147 according to priorities thereof. For example, the middleware 143 may assign priorities for using the system resources (e.g., the bus 110, the processor 120, the memory 130, or the like) of the electronic device 101, to at least one of the applications 147. For example, the middleware 143 may perform scheduling or loading balancing on the one or more task requests by processing the one or more task requests according to the priorities assigned thereto.

The API 145 is an interface through which the applications 147 control functions provided from the kernel 141 or the middleware 143, and may include, for example, at least one interface or function (e.g., instruction) for file control, window control, image processing, or text control.

The input/output interface 150 may forward instructions or data input from a user through an input/output device (e.g., various sensors, such as an acceleration sensor or a gyro sensor, and/or a device such as a keyboard or a touch screen), to the processor 120, the memory 130, or the communication interface 170 through the bus 110. For example, the input/output interface 150 may provide the processor 120 with data on a user' touch entered on a touch screen. Furthermore, the input/output interface 150 may output instructions or data, received from, for example, the processor 120, the memory 130, or the communication interface 170 via the bus 110, through an output unit (e.g., a speaker or the display 160).

The display 160 may include, for example, a liquid crystal display (LCD), a light emitting diode (LED) display, an organic LED (OLED) display, a micro electro mechanical system (MEMS) display, an electronic paper display, and the like. The display 160, for example, may display various types of content (e.g., a text, images, videos, icons, symbols, and the like) for the user. The display 160 may include a touch screen and receive, for example, a touch, a gesture, proximity, a hovering input, and the like, using an electronic pen or the user's body part. According to an embodiment of the present disclosure, the display 160 may display a web page.

The communication interface 170, for example, may set communication between the electronic device 101 and an external device (e.g., the first external electronic device 102, the second external electronic device 104, or the server 106). For example, the communication interface 170 may be connected to a network 162 through wireless or wired communication to communicate with the external device (e.g., the second external electronic device 104 or the server 106).

The wireless communication may use at least one of, for example, long term evolution (LTE), LTE-advance (LTE-A), code division multiple access (CDMA), wideband CDMA (WCDMA), universal mobile telecommunications system (UMTS), wireless broadband (WiBro), and global system for mobile communications (GSM), as a cellular communication protocol. In addition, the wireless communication may include, for example, short range communication 164. The short-range communication 164 may include at least one of, for example, Wi-Fi, Bluetooth, Bluetooth low energy (BLE), near field communication (NFC), or Zigbee. The wireless communication may also utilize a global navigation satellite system (GNSS).

The GNSS may include at least one of, for example, a GPS, a global navigation satellite system (Glonass), a Beidou navigation satellite system (hereinafter, referred to as "Beidou"), and European global satellite-based navigation system (Galileo). Hereinafter, in an embodiment of the present disclosure, the "GPS" may be interchangeably used with the "GNSS". The wired communication may include, for example, at least one of a universal serial bus (USB), a high definition multimedia interface (HDMI), recommended standard 232 (RS-232), and a plain old telephone service (POTS). The network 162 may include at least one of a communication network, such as a computer network (e.g., a local area network (LAN) or a wide area network (WAN)), the internet, and a telephone network.

Each of the first external electronic device 102 and the second external electronic device 104 may be a device which is the same as or different from the electronic device 101. According to an embodiment of the present disclosure, the server 106 may include a group of one or more servers. According to various embodiments of the present disclosure, all or a part of operations performed in the electronic device 101 can be performed in the other electronic device or multiple electronic devices (e.g., the first external electronic device 102 or the second external electronic device 104 or the server 106). According to an embodiment of the present disclosure, when the electronic device 101 should perform some functions or services automatically or by a request, the electronic device 101 may make a request for performing at least some functions related to the functions or services to another device (e.g., the first external electronic device 102 or the second external electronic device 104, or the server 106) instead of performing the functions or services by itself or additionally. Another electronic device (e.g., the first external electronic device 102 or the second external electronic device 104, or the server 106) may perform a function requested from the electronic device 101 or an additional function and transfer the performed result to the electronic device 101. The electronic device 101 can provide the requested function or service to another electronic device by processing the received result as it is or additionally. To this end, for example, cloud computing, distributed computing, or client-server computing technology may be used.

Figure 2:
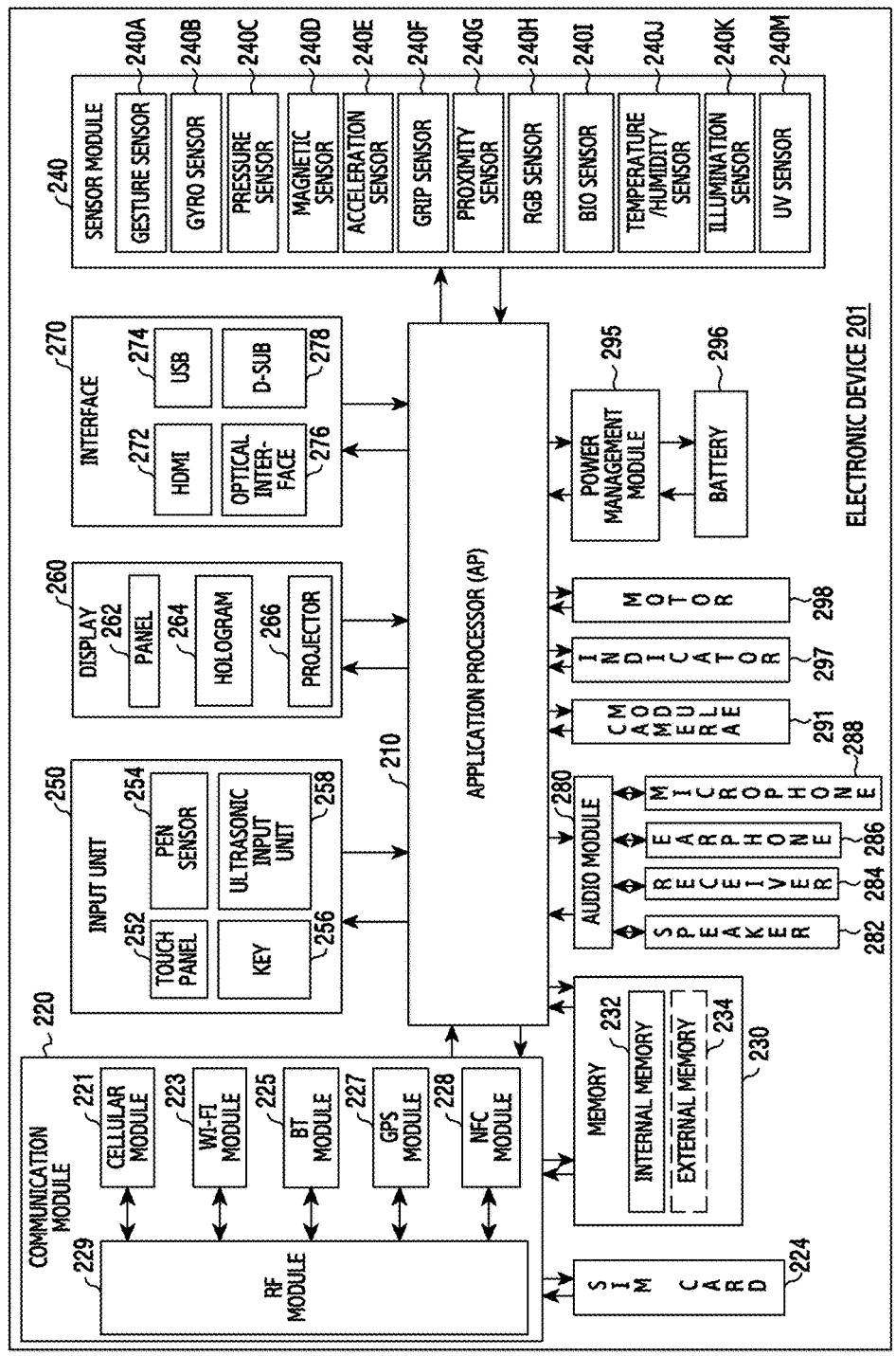
FIG. 2 is a block diagram of an example of an electronic device, according to various embodiments.

FIG. 2 is a block diagram of an example of an electronic device 201, according to various embodiments. The electronic device 201 may include all or some parts of the electronic device 101 of FIG. 1. The electronic device 201 may include one or more processors (e.g., an Application Processor (AP)) 210, a communication module 220, a Subscriber Identification Module (SIM) module 224, a memory 230, a sensor module 240, an input unit 250, a display 260, an interface 270, an audio module 280, a camera module 291, a power management module 295, a battery 296, an indicator 297, and a motor 298.

The processor 210 may control a plurality of hardware or software components connected to the processor 210 by driving an OS or an application program and perform processing of various pieces of data and calculations. The processor 210 may be implemented by, for example, a system on chip (SoC). According to an embodiment of the present disclosure, the processor 210 may further include a graphics processing unit (GPU) and/or an image signal processor (ISP). The processor 210 may include at least some (e.g., a cellular module 221) of the elements illustrated in FIG. 2. The processor 210 may load, into a volatile memory, instructions or data received from at least one (e.g., a non-volatile memory) of the other elements and may process the loaded instructions or data, and may store various data in a non-volatile memory.

The communication module 220 may have a configuration equal or similar to that of the communication interface 170 of FIG. 1. The communication module 220 may include, for example, the cellular module 221, a Wi-Fi module 222, a Bluetooth module 223, a GNSS module 224 (e.g., a GPS module, a Glonass module, a Beidou module, or a Galileo module), an NFC module 225, an MST module 226, and a radio frequency (RF) module 227.

The cellular module 221 may provide a voice call, image call, a text message service, or an Internet service through, for example, a communication network. According to an embodiment of the present disclosure, the cellular module 221 may distinguish between and authenticate electronic devices 201 within a communication network using a subscriber identification module (e.g., the SIM card 229). According to an embodiment of the present disclosure, the cellular module 221 may perform at least some of the functions that the processor 210 may provide. According to an embodiment of the present disclosure, the cellular module 221 may include a CP.

Each of the Wi-Fi module 222, the BT module 223, the GNSS module 224, the NFC module 225 and the MST module 226 may include, for example, a processor for processing data transmitted and received through the relevant module. According to various embodiments of the present disclosure, at least some (e.g., two or more) of the cellular module 221, the Wi-Fi module 222, the BT module 223, the GNSS module 224, the NFC module 225, and the MST module 226 may be included in one integrated chip (IC) or IC package.

The RF module 227 may transmit/receive, for example, a communication signal (e.g., an RF signal). The RF module 227 may include, for example, a transceiver, a power amp module (PAM), a frequency filter, a low noise amplifier (LNA), and/or an antenna. According to another embodiment of the present disclosure, at least one of the cellular module 221, the Wi-Fi module 222, the Bluetooth module 223, the GNSS module 224, the NFC module 225, or the MST module 226 may transmit and receive RF signals through a separate RF module(s).

The subscriber identification module 229 may include, for example, a card including a subscriber identity module and/or an embedded SIM, and may contain unique identification information (e.g., an integrated circuit card identifier (ICCID)) or subscriber information (e.g., an international mobile subscriber identity (IMSI)). The memory 230 (e.g., the memory 13 ) may include, for example, an internal memory 232 or an external memory 234. The internal memory 232 may include at least one of, for example, a volatile memory (e.g., a dynamic random access memory (DRAM), a static RAM (SRAM), a synchronous dynamic RAM (SDRAM), and the like) and a non-volatile memory (e.g., a one-time programmable read only memory (OTPROM), a programmable ROM (PROM), an erasable and programmable ROM (EPROM), an electrically erasable and programmable ROM (EEPROM), a flash memory (e.g., a NAND flash memory or a NOR flash memory), a hard driver, or a solid state drive (SSD).

An external memory 234 may further include a flash drive, for example, a compact flash (CF), a secure digital (SD), a Micro-SD, a Mini-SD, an extreme digital (xD), a multi-media card (MMC), a memory stick, and the like. The external memory 234 may be functionally and/or physically connected to the electronic device 201 through various interfaces.

The sensor module 240 may measure a physical quantity or detect an operation state of the electronic device 201, and may convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red, green, blue (RGB) sensor), a biometric sensor 240I, a temperature/humidity sensor 240J, a light sensor 240K, and a ultraviolet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. In various embodiments of the present disclosure, an electronic device 201 may further include a processor configured to control the sensor module 240 as a part of or separately from the processor 210, and may control the sensor module 240 while the processor 210 is in a sleep state.

The input device 250 may include, for example, a touch panel 252, a (digital) pen sensor 254, a key 256, or an ultrasonic input device 258. The touch panel 252 may use at least one of, for example, a capacitive scheme, a resistive scheme, an infrared scheme, and an ultrasonic scheme. In addition, the touch panel 252 may further include a control circuit. The touch panel 252 may further include a tactile layer and provide a tactile reaction to the user.

The (digital) pen sensor 254 may include, for example, a recognition sheet which is a part of the touch panel or is separated from the touch panel. The key 256 may include, for example, a physical button, an optical key, a keypad, and the like. The ultrasonic input device 258 may detect ultrasonic wave generated by an input tool through a microphone (e.g., a microphone 288) and identify data corresponding to the detected ultrasonic waves.

The display 260 (e.g., the display 160) may include a panel 262, a hologram device 264, or a projector 266. The panel 262 may include a configuration identical or similar to that of the display 160 illustrated in FIG. 1. The panel 262 may be implemented to be, for example, flexible, transparent, or wearable. The panel 262 and the touch panel 252 may be configured by one module. The hologram device 264 may show a three dimensional image in the air by using an interference of light. The projector 266 may display an image by projecting light onto a screen. The screen may be located, for example, inside or outside the electronic device 201. According to an embodiment of the present disclosure, the display 260 may further include a control circuit for controlling the panel 262, the hologram device 264, or the projector 266.

The interface 270 may include, for example, an HDMI 272, a USB 274, an optical interface 276, or a D-subminiature (D-sub) 278. The interface 270 may be included in, for example, the communication interface 170 illustrated in FIG. 1. Additionally or alternatively, the interface 270 may include, for example, a mobile high-definition link (MHL) interface, a SD card/ MMC interface, or an infrared data association (IrDA) standard interface.

The audio module 280 may bilaterally convert, for example, a sound and an electrical signal. At least some elements of the audio module 280 may be included in, for example, the input/output interface 145 illustrated in FIG. 1. The audio module 280 may process sound information which is input or output through, for example, a speaker 282, a receiver 284, earphones 286, the microphone 288, and the like.

The camera module 291 is a device which may photograph a still image and a dynamic image. According to an embodiment of the present disclosure, the camera module 291 may include one or more image sensors (e.g., a front sensor or a back sensor), a lens, an ISP or a flash (e.g., an LED or a xenon lamp).

The power management module 295 may manage, for example, power of the electronic device 201. According to an embodiment of the present disclosure, the power management module 295 may include a power management integrated circuit (PMIC), a charger integrated circuit (IC), or a battery or fuel gauge. The PMIC may use a wired and/or wireless charging method. Examples of the wireless charging method may include, for example, a magnetic resonance method, a magnetic induction method, an electromagnetic method, and the like, and may further include additional circuits (e.g., a coil loop, a resonance circuit, a rectifier, and the like) for wireless charging. The battery gauge may measure, for example, a residual quantity of the battery 296, and a voltage, a current, or a temperature during the charging. The battery 296 may include, for example, a rechargeable battery or a solar battery.

The indicator 297 may indicate a particular state (e.g., a booting state, a message state, a charging state, and the like) of the electronic device 201 or a part (e.g., the processor 210) of the electronic device 2201. The motor 298 may convert an electrical signal into mechanical vibration, and may generate vibration, a haptic effect, and the like. Although not illustrated, the electronic device 201 may include a processing unit (e.g., a GPU) for supporting a mobile TV. The processing unit for supporting mobile TV may, for example, process media data according to a certain standard, such as digital multimedia broadcasting (DMB), digital video broadcasting (DVB), or mediaFLO™.

Each of the components of the electronic device according to the present disclosure may be implemented by one or more components, and the name of the corresponding component may vary depending on the type of the electronic device. The electronic device according to various embodiments of the present disclosure may include at least one of the aforementioned elements. Some elements may be omitted or other additional elements may be further included in the electronic device. In addition, some of the hardware components according to various embodiments may be combined into one entity, which may perform functions identical to those of the relevant components before the combination.

Figure 3:
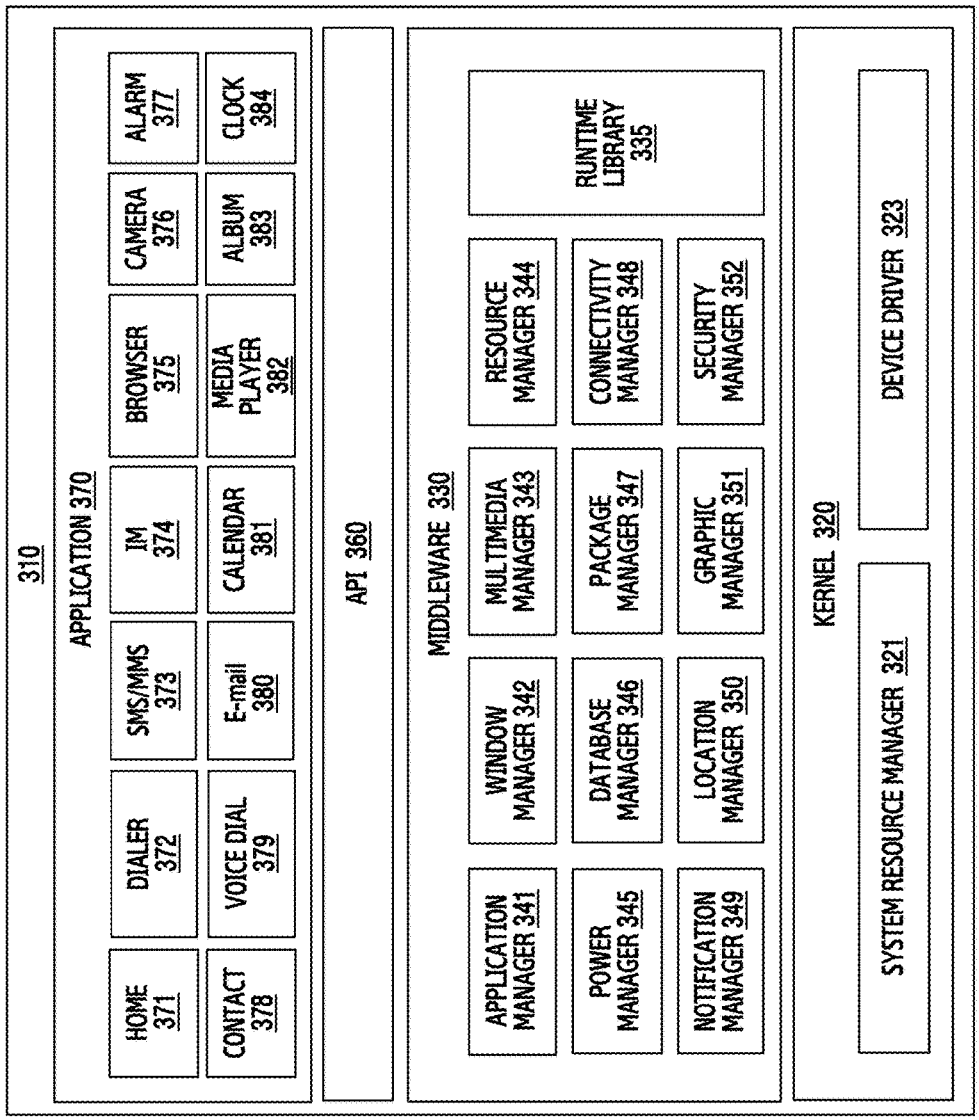
FIG. 3 is a block diagram of an example of a program module, according to various embodiments.

FIG. 3 is a block diagram of an example of a program module, according to various embodiments.

Referring to FIG. 3, according to an embodiment of the present disclosure, a program module 310 (e.g., a program 140) may include an OS for controlling resources associated with an electronic apparatus (e.g., the electronic device 101) and/or various applications (e.g., an application program 147) running on the operating system. The OS may be, for example, Android, iOS, Windows, Symbian, Tizen, Bada, and the like.

The program module 310 may include a kernel 320, middleware 330, an API 360, and/or an application 370. At least a part of the program module 310 can be preloaded on the electronic device (e.g., electronic device 101) or downloaded from the server.

The kernel 320 (e.g., the kernel 141) may include, for example, a system resource manager 321 or a device driver 323. The system resource manager 321 may control, allocate, or collect the system resources. According to an embodiment of the present disclosure, the system resource manager 321 may include a process management unit, a memory management unit, a file system management unit, and the like. The device driver 323 may include, for example, a display driver, a camera driver, a BT driver, a shared-memory driver, a USB driver, a keypad driver, a Wi-Fi driver, an audio driver, an inter-process communication (IPC) driver, and the like. According to an embodiment of the present disclosure, a Wi-Fi driver of the kernel 320 may control at least one of an antenna mode or a transmission period of a network control message for use to transmit and receive signals to and from the communication interface 170.

The middleware 330 may provide, for example, a function commonly required by the applications 370 in common or provide various functions to the applications 370 through the API 360 so that the applications 370 can efficiently use limited system resources within the electronic device. According to an embodiment of the present disclosure, the middleware 330 (e.g., the middleware 143) may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a compiler uses to add new functions through a programming language while the application 370 is executed. The run time library 335 may perform input/output management, memory management, or a function for an arithmetic function.

The application manager 341 may manage, for example, a life cycle of at least one of the applications 370. The window manager 342 may manage graphical user interface (GUI) resources used by a screen. The multimedia manager 343 may grasp formats required for the reproduction of various media files, and may perform an encoding or decoding of the media file by using a codec suitable for the corresponding format. The resource manager 344 may manage resources, such as a source code, a memory, and a storage space of at least one of the applications 370.

The power manager 345 may operate together with a basic input/output system (BIOS) to manage a battery or power and may provide power information required for the operation of the electronic device. The database manager 346 may generate, search for, or change a database to be used by at least one of the applications 370. The package manager 347 may manage the installation or the updating of applications distributed in the form of package file.

The connectivity manager 348 may manage wireless connection of, for example, Wi-Fi or BT. The notification manager 349 can display or notify of an event, such as an arrival message, a promise, a proximity notification, and the like, in such a way that does not disturb a user. The location manager 350 may manage location information of the electronic device. The graphic manager 351 may manage graphic effects to be provided to a user and user interfaces related to the graphic effects. The security manager 352 may provide all security functions required for system security or user authentication.

The middleware 330 may include a middleware module for forming a combination of various functions of the aforementioned components. The middleware 330 may provide modules specialized according to types of operating systems in order to provide differentiated functions. Further, the middleware 330 may dynamically remove some of the existing components or add new components.

The API 360 (e.g., the API 145) is, for example, a set of API programming functions, and a different configuration thereof may be provided according to an operating system. For example, with respect to each platform, one API set may be provided in a case of Android or iOS, and two or more API sets may be provided in a case of Tizen.

The applications 370 (e.g., the application programs 147) may include, for example, one or more applications which can provide functions, such as a home function 371, a dialer 372, an SMS/MMS 373, an instant message (IM) 374, a browser 375, a camera 376, an alarm 377, contacts 378, a voice dialer 379, an email 380, a calendar 381, a media player 382, an album 383, a clock 384, a healthcare function (e.g., to measure exercise burnt calorie, or blood sugar), or an environment information (e.g., an atmospheric pressure, humidity, temperature information, and the like).

According to an embodiment of the present disclosure, the application 370 may include an application (hereinafter, for convenience of explanation, "Information Exchange application") that supports the exchange of information between the electronic device (e.g., the electronic device 101) and the external electronic device. The application associated with exchanging information may include, for example, a notification relay application for notifying an external electronic device of certain information or a device management application for managing an external electronic device.

For example, a notification relay application may include a function of transferring the notification information generated by other applications (e.g., an SMS/MMS application, an e-mail application, a healthcare application, an environmental information application, and the like) of the electronic device to the external electronic device. Further, the notification relay application may receive notification information from, for example, the external electronic device and provide the received notification information to the user. For example, the device management application may manage (e.g., install, delete, or update) at least one function (e.g., turning on/off the external electronic device itself (or some elements thereof) or adjusting the brightness (or resolution) of a display) of the external electronic device communicating with the electronic device, applications operating in the external electronic device, or services (e.g., a telephone call service or a message service) provided from the external electronic device.

According to an embodiment of the present disclosure, the application 370 may include an application (e.g., a health management application) specified according to an attribute (e.g., as an attribute of the electronic device, the type of electronic device is a mobile medical equipment) of the external electronic device. According to an embodiment of the present disclosure, the application 370 may include an application received from the external electronic device (e.g., a server, an electronic device, and the like). According to an embodiment of the present disclosure, the applications 370 may include a preloaded application or a third party application which can be downloaded from the server. The names of the elements of the program module 310, according to the embodiment illustrated in FIG. 3, may vary according to the type of operating system.

According to various embodiments of the present disclosure, at least a part of the program module 310 may be implemented in software, firmware, hardware, or a combination of two or more thereof. At least a part of the program module 310 can be implemented (e.g., executed), for example, by a processor (e.g., by an application program). At least some of the program module 310 may include, for example, a module, program, routine, sets of instructions, or process for performing one or more functions.

According to an embodiment of the present disclosure, the applications 370 may include an application (hereinafter, referred to as an "information exchange application" for convenience of description) supporting information exchange between the electronic device (e.g., the electronic device 101) and an external electronic device (e.g., the first external electronic device 102 or the second external electronic device 104). The information exchange application may include, for example, a notification relay application for transferring specific information to an external electronic device or a device management application for managing an external electronic device.

For example, the notification relay application may include a function of transferring, to the external electronic device (e.g., the first external electronic device 102 or the second external electronic device 104), notification information generated from other applications of the electronic device 101 (e.g., an SMS/MMS application, an e-mail application, a health management application, or an environmental information application). Further, the notification relay application may receive notification information from, for example, an external electronic device and provide the received notification information to a user.

For example, the device management application may manage (e.g., install, delete, or update) at least one function of an external electronic device (e.g., the second external electronic device 104) communicating with the electronic device (e.g., a function of turning on/off the external electronic device itself (or some components) or a function of adjusting luminance (or a resolution) of the display), applications operating in the external electronic device, or services provided by the external electronic device (e.g., a call service and a message service).

Figure 4A:
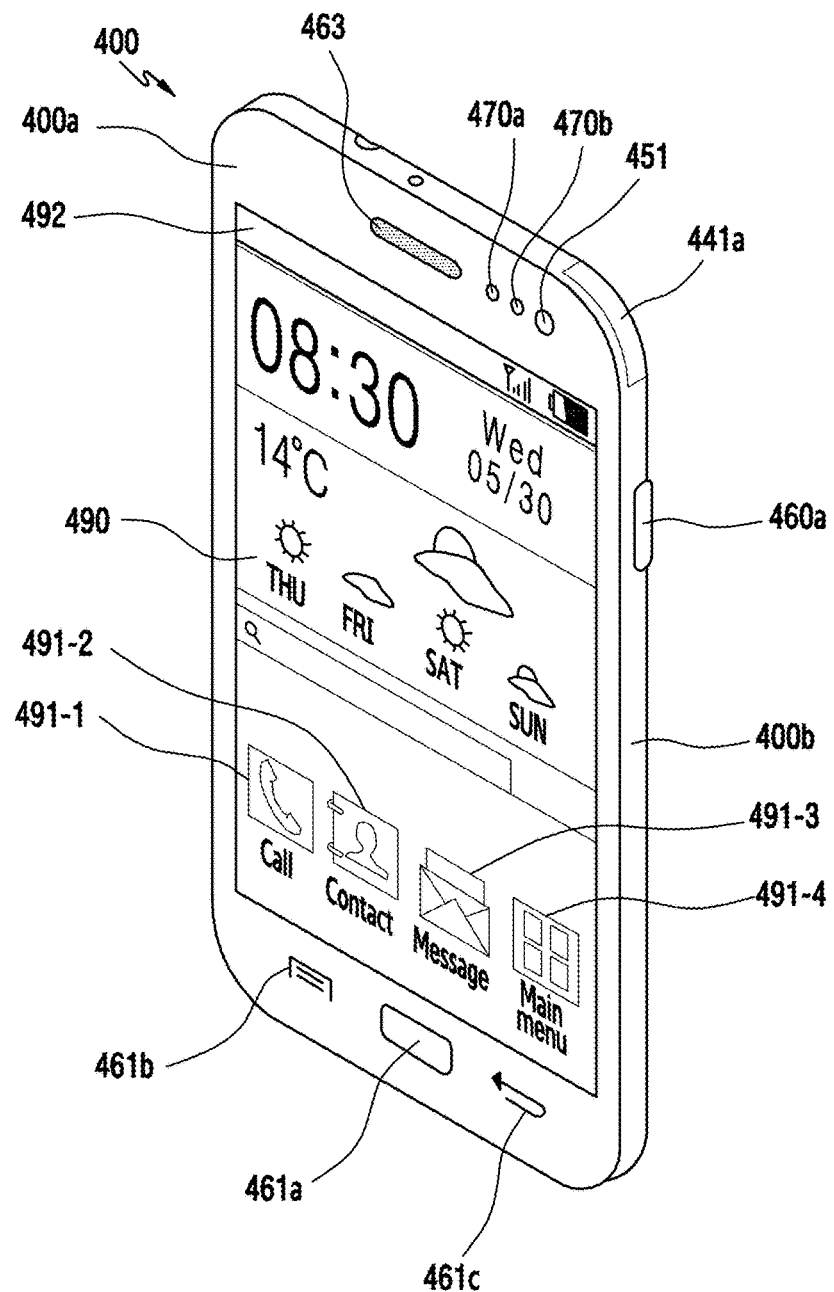
FIG. 4A is a diagram of an example of an electronic device, according to various embodiments.
Figure 4B:
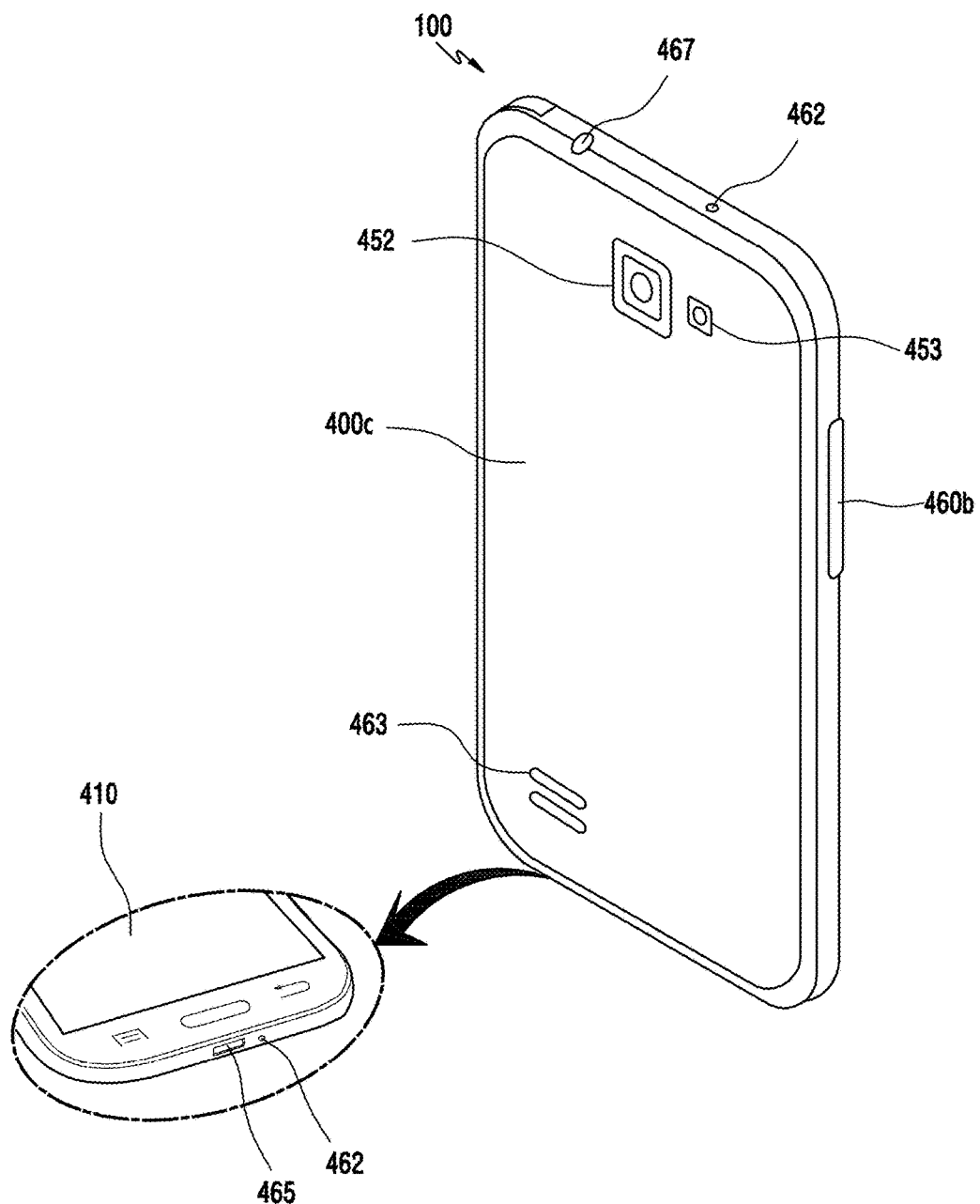
FIG. 4B is a diagram of an example of an electronic device, according to various embodiments.

FIG. 4A is a front perspective view of an electronic device according to various embodiments of the present disclosure. FIG. 4B is a rear perspective view of the electronic device according to various embodiments of the present disclosure.

Referring to FIG. 4A and FIG. 4B, a touch screen 490 is disposed to a center of a front surface 400a of an electronic device 400. The touch screen 490 is formed in a large size to occupy a great part of the front surface 400a of the electronic device 400. An example in which a main home screen is displayed to the touch screen 490 is shown in FIG. 2. The main home screen is a first screen displayed on the touch screen 490 when the electronic device 400 is powered on. In addition, when the electronic device 400 has different home screens with several pages, the main home screen may be a first home screen among the home screens with the several pages. Shortcut icons 491-1, 491-2, and 491-3 for executing frequently used applications, a main menu switching key 491-4, a time, a weather, or the like may be displayed to the home screen. The main menu switching key 491-4 displays a menu screen on the touch screen 490. In addition, an upper end of the touch screen 490 may be formed with a status bar 492 for displaying a status of the device 400, such as a battery charging status, received signal strength, and a current time. A bottom portion of the touch screen 490 may be formed with a home button 461a, a menu button 461b, and a back button 461c.

The home button 461a is used to display the main home screen to the touch screen 490. For example, if the home key 461a is touched in a state in which any home screen different from the main home screen or a menu screen is displayed to the touch screen 490, the main home screen may be displayed to the touch screen 490. In addition, if the home button 461a is touched during applications are executed on the touch screen 490, the main home screen of FIG. 4 may be displayed on the touch screen 490. In addition, the home button 461a may be used to display recently used applications on the touch screen 490 or to display a task manager.

The menu button 461b provides a linked menu that can be used on the touch screen 490. The linked menu may include a widget addition menu, a background screen change menu, a search menu, an edit menu, an environment configuration menu, and the like. The back button 461c may display a screen executed immediately previous to a currently executed screen, or may terminate the most recently used application.

A first camera 451, an illumination sensor 470a, and a proximity sensor 470b may be disposed to an edge of the front surface 400a of the electronic device 400. A second camera 452, a flash 453, and a speaker 463 may be disposed to a rear surface 400c of the electronic device 400.

For example, a power/reset button 460a, a sound volume button 460b, a terrestrial Digital Multimedia Broadcasting (DMB) antenna 441a for receiving broadcasting, one or multiple microphones 462, and the like may be disposed to a side surface 400b of the electronic device 400. The DMB antenna 441a may be fixed to the electronic device 400, or may be formed in a detachable manner.

In addition, a connector 465 is formed to a bottom side surface of the electronic device 400. A plurality of electrodes are formed to the connector 465, and may be connected to an external device in a wired manner. An earphone connection jack 467 may be disposed to an upper side surface of the electronic device 400. An earphone may be inserted to the earphone connection jack 467. The earphone connection jack 467 may also be disposed to a bottom side surface of the electronic device 400.

Although not shown in FIG. 4A and FIG. 4B, a fingerprint sensor may be disposed in various manners to the front surface 100a, side surface 400b, or rear surface 400c of the electronic device 400. For example, if the fingerprint sensor is disposed to the front surface 400a, the fingerprint sensor may be disposed to some areas of the touch screen 490. Alternatively, the fingerprint sensor may be implemented in a button (e.g., the home button 461a, the menu button 461b, or the back button 461c) located in the front surface. For another example, if the fingerprint sensor is located to the rear surface 400c, the fingerprint sensor may be disposed to some areas of the rear surface 400c. For another example, if the fingerprint sensor is located to the side surface 400c, the fingerprint sensor may be disposed to some areas of the side surface 400b. Alternatively, the fingerprint sensor may be implemented in a button (e.g., the power/reset button 460a) located in the side surface.

Figure 6:
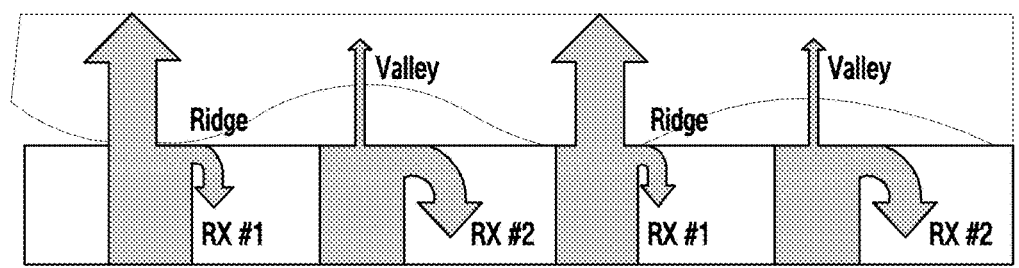
FIG. 6 is a diagram of an example of an ultrasonic fingerprint sensor, according to various embodiments.
Figure 7:
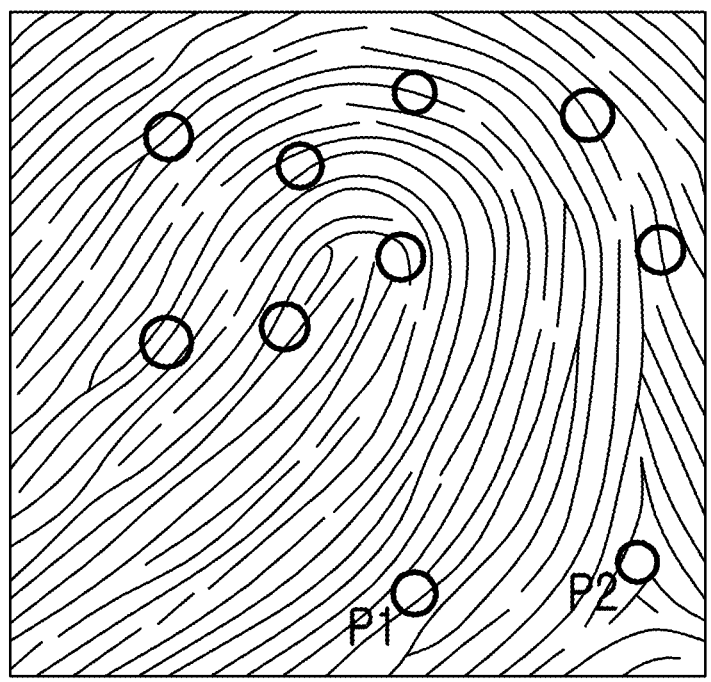
FIG. 7 is a diagram of an example of a fingerprint, according to various embodiments.

FIG. 6 is a diagram of an example of an ultrasonic fingerprint sensor, according to various embodiments. FIG. 7 illustrates an example of a typical fingerprint. In FIG. 7, P1 indicates a ridge of the fingerprint, and P2 indicates a valley of the fingerprint.

Referring to FIG. 6 and FIG. 7, ultrasound may emit a sound wave by using a transmitter (Tx), and may determine the shape of the fingerprint according to an amplitude of the reflected sound wave. In this case, a ridge R of a finger is in contact with the sensor surface, and a valley thereof is not in contact with the sensor surface, thereby forming an air gap. Sound has a sound wave impedance difference between a medium and air, and thus a reflection coefficient difference occurs. By using this, the ridge/valley is determined with an amplitude of the sound reflected and received in Rx. In general, the fingerprint sensor may include a fingerprint input unit and a fingerprint processing unit. The fingerprint input unit is a portion for a fingerprint input, and may be constructed of a transmitter (Tx) for transmitting a signal and a receiver (Rx) for receiving a signal. Further, the fingerprint processing unit may control the transmitter (Tx) and the receiver (Rx) to determine whether to perform fingerprint authentication (by using a controller).

TABLE 1

|  | Air | Tissue | epotek W | epotek | RTV rubber | urethane |
|---|---|---|---|---|---|---|
| A.imp. (Mrayl) | 0.0004 | 1.63 | 6.93 | 3.05 | 1.3 | 1.8 |
| FOM | 1 |  | 1.6 | 3.3 | 8.9 | 20.2 |

The fingerprint shape may be recognized by measuring a sound wave pressure difference of a signal reflected from a contact surface. Referring to Table 1, a portion in contact with a human finger is a matching layer, and a Figure Of Merit (FOM) value becomes different according to an impedance of this layer. For example, when the matching layer is formed of Epotek, the fingerprint shape can be distinguished more clearly since the FOM is relatively differentiated. In an ultrasonic sensor, a sound wave is emitted, and a fingerprint can be recognized through Time Of Flight (TOF) associated with the sound wave.

A pulse of the sound wave is transmitted through the sensor surface, and this sound wave is reflected according to a medium in contact with the sensor surface. In this case, the sound wave may be reflected by an air gap or a material such as glass of the sensor surface. That is, the sound wave may be sent to a finger, and a TOF value of a signal which returns by a sound wave impedance difference may be patterned to extract the fingerprint. The fingerprint processing unit recognizes the fingerprint by processing a signal value measured by the fingerprint input unit. In a normal state, the ridge/valley is determined with an original function of the ultrasonic sensor, and may be patterned to image the fingerprint shape.

An operation of a fingerprint sensor according to various embodiments is described below with reference to FIG. 8 and FIG. 9.

If a fingerprint is recognized, a signal reflected by air when ultrasound is delivered to a finger has a small magnitude in a ridge, and the signal reflected by the air has a great magnitude in a valley. If the signals are arranged, a magnitude of each signal is digitized and divided into a level to generate an image.

When a sound wave signal encounters a medium having various sound wave impedances, signal attenuation occurs. In this case, several echo signals may be received at a time of TOF when the sound wave signal is increased.

Figure 8:
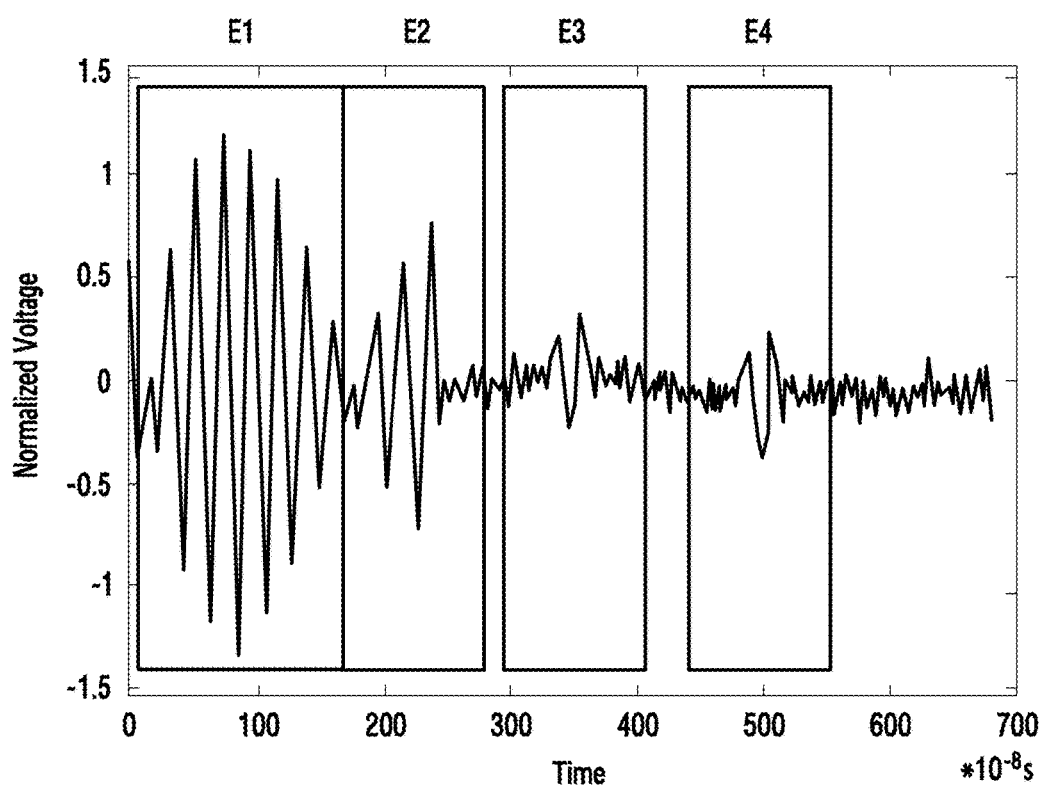
FIG. 8 is a diagram of an example of echo waveforms E1-E4 that are associated with a first point of a fingerprint, according to various embodiments.
Figure 9:
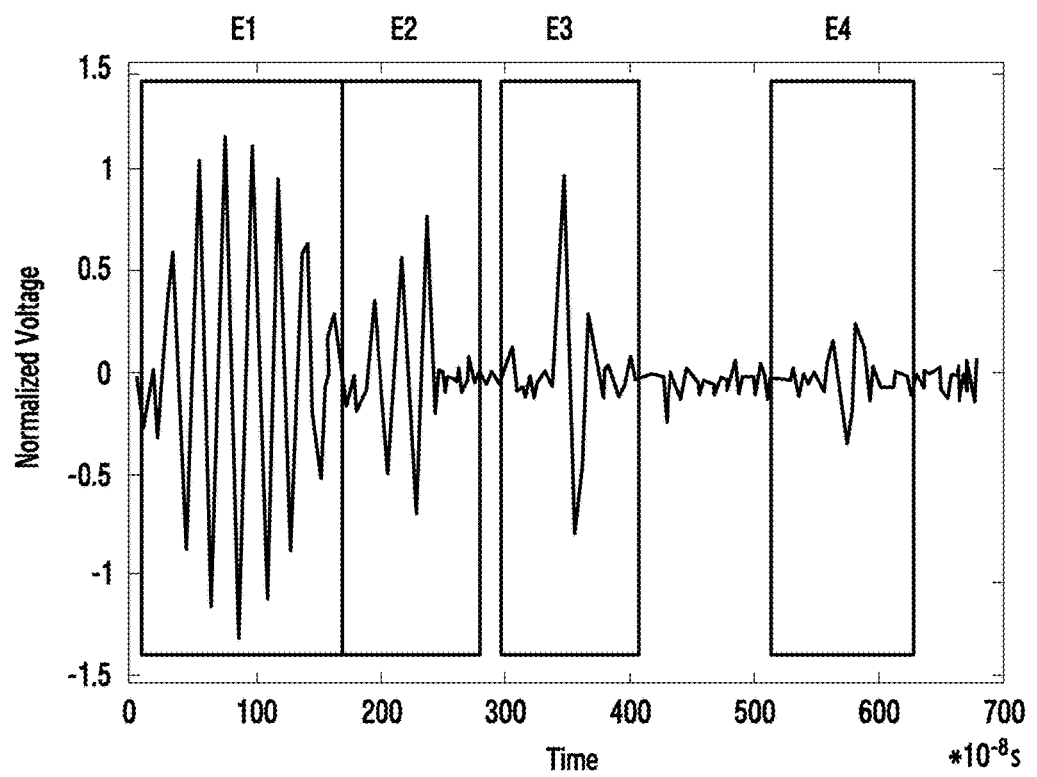
FIG. 9 is a diagram of an example of echo waveforms E1-E4 that are associated with a first point of a fingerprint, according to various embodiments.

FIG. 8 and FIG. 9 respectively illustrate several echo signals E1 to E4 received by the receiver (Rx) of a fingerprint sensor, according to various embodiments. FIG. 8 illustrates a waveform at a first point of the fingerprint, and FIG. 9 illustrates a waveform at a second point, according to various embodiments. The echo signal may vary depending on a surface configuration of an electronic device. When various layers such as glass, plate, or the like are present on a surface of a fingerprint sensor, the echo signal reflected according to a medium difference is generated.

Herein, the first point and the second point may be any pixels among pixels included in a sensing area of the fingerprint sensor. The first point may be one pixel among the pixels, and the second point may be a pixel located in a position different from the first point among the pixels.

E1 and E2 are reflected waves caused by a fixed layer, and may be respectively observed in the first point (FIG. 8) and the second point (FIG. 9) at the same time. The fixed layer may include a window layer and/or an air gap.

If E3 is a reflected wave caused by a real finger, E3 at the first point (FIG. 8) and the second point (FIG. 9) may be generated at the same time. In addition, a waveform of E3 may be different at the first point (FIG. 8) and the second point (FIG. 9).

If E4 is a reflected wave caused by an inner portion of the real finger, E4 at the first point (FIG. 8) and the second point (FIG. 9) may be generated at different times.

Hereinafter, a method of distinguishing a fake finger by using an additional echo signal or distinguishing a finger wearing a glove (e.g., a plastic or leather glove) will be described with reference to FIG. 10 to FIG. 15.

Figure 10:
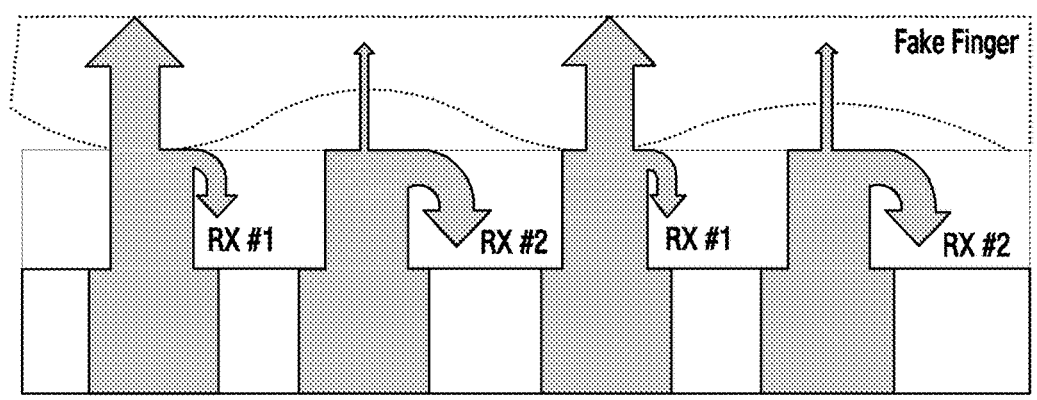
FIG. 10 is a diagram illustrating an example in which a counterfeit fingerprint is sensed by a fingerprint sensor according to various embodiments.

FIG. 10 is a diagram illustrating an example in which a counterfeit fingerprint is sensed by a fingerprint sensor according to various embodiments.

Figure 11:
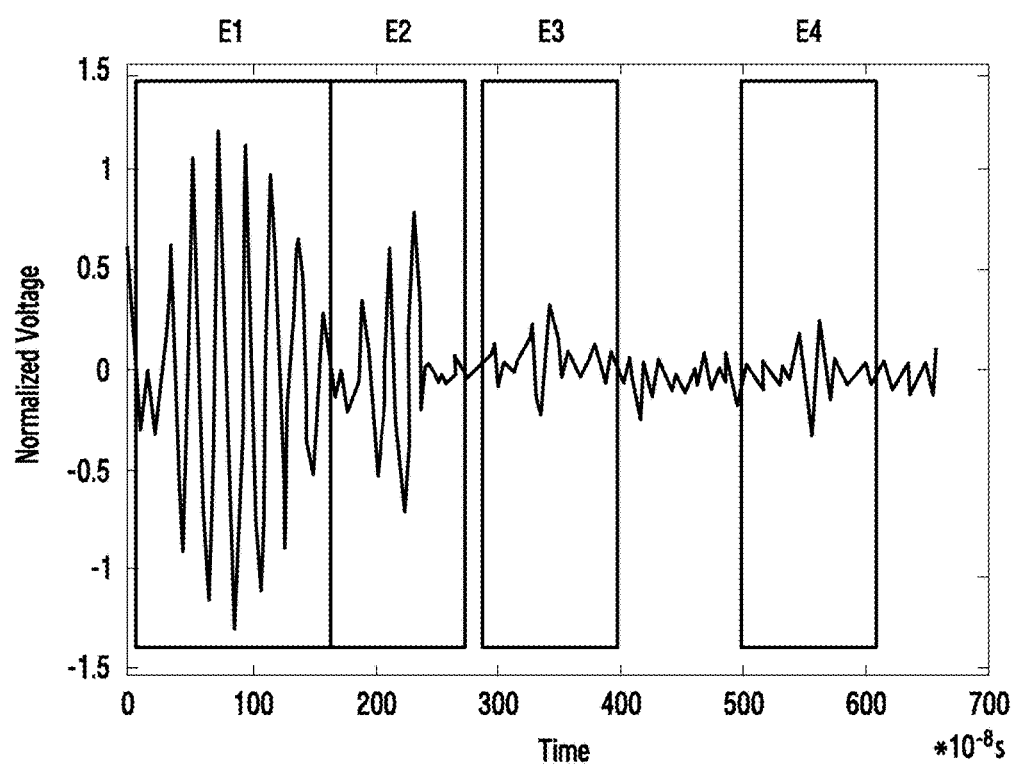
FIG. 11 is a diagram of an example of echo waveforms E1-E4 that are associated with a first point of a fingerprint, according to various embodiments.
Figure 12:
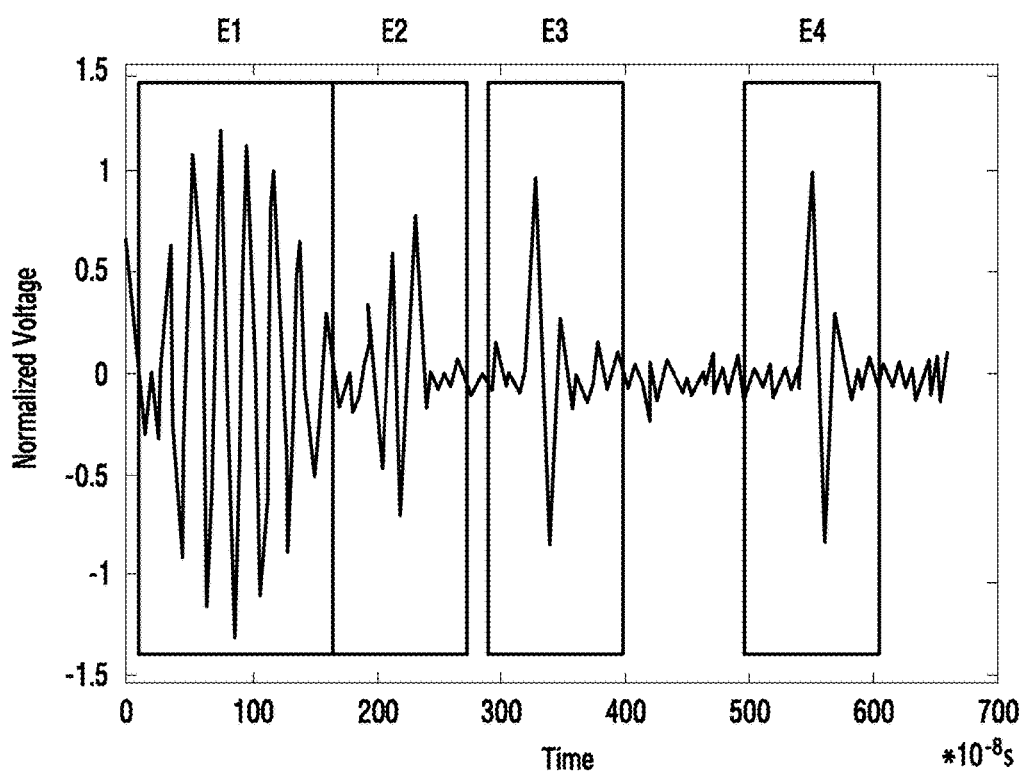
FIG. 12 is a diagram of an example of echo waveforms E1-E4 that are associated with a first point of a fingerprint, according to various embodiments.

FIG. 11 and FIG. 12 respectively illustrate several echo signals E1 to E4 received by the receiver (Rx) of a fingerprint sensor. More particularly, FIG. 11 illustrates a waveform associated with a first point (e.g., P1) in the fingerprint, and FIG. 12 illustrates a waveform associated with a second point (e.g., P2) in the fingerprint. The echo signal may vary depending on a surface configuration of an electronic device. When various layers such as glass, plate, or the like are present on a surface of a fingerprint sensor, the echo signal reflected according to a medium difference is generated.

Herein, E1 and E2 are reflected waves caused by a fixed layer, and may be respectively observed at P1 (FIGS. 11) and P2 (FIG. 12) at the same time. For example, the fixed layer may include a window layer and/or an air gap. In addition, E3 is a reflected wave caused by an object, and may be observed at the same time at P1 (FIGS. 11) and P2 (FIG. 12). Herein, the object may be a real finger, a fake finger, a real finger wearing a glove, or the like. The electronic device according to various embodiments of the present disclosure may determine a type of the object by comparing the times when E4 of P1 and E4 of P2 are detected. For example, if E4 of P1 and E4 of P2 are distributed at the same timeline as shown in FIG. 11 and FIG. 12, the electronic device may detect that a specific layer is included inside the object, and determine that the object is the fake finger.

For example, if E4 of P1 and E4 of P2 are detected at different times, the electronic device may detect that different media are included inside the object, and determine that the object is the real finger. This is because the times of E4 corresponding to two points of the fingerprint are different since there may be different types of tissues at positions in the finger that correspond to the two points, such as a bone, a blood vessel, or the like.

Although it is described in various embodiments of the present disclosure that the electronic device distinguishes a type of the object by using a mutual relation between the echo signals corresponding to the two points of the fingerprint, the present disclosure is not limited thereto. For example, the electronic device may distinguish the type of the object by using the mutual relation between the echo signals corresponding to a plurality of points.

Figure 13:
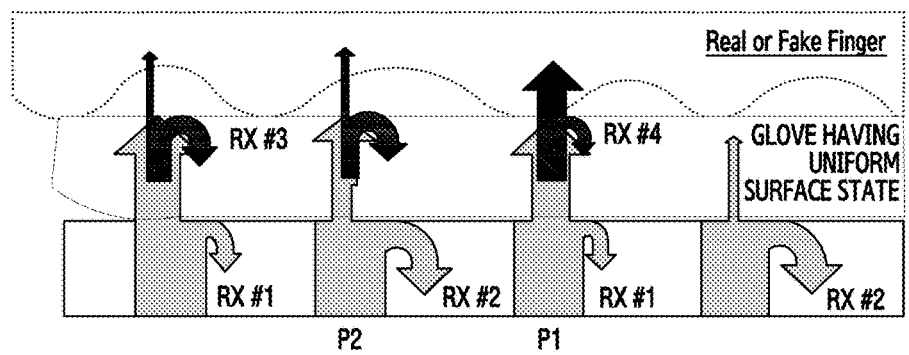
FIG. 13 is a diagram illustrating an example in which a glove is sensed by a fingerprint sensor, according to various embodiments.
Figure 14:
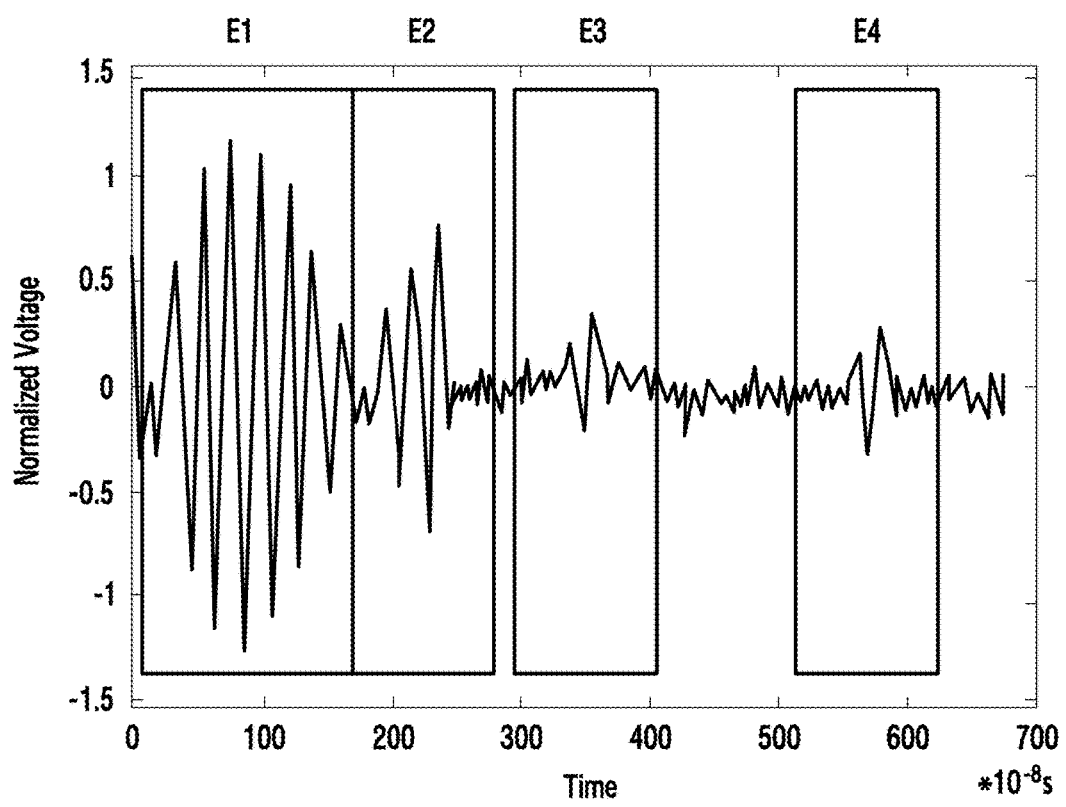
FIG. 14 is a diagram of an example of echo waveforms E1-E4 that are associated with a first point in a fingerprint, according to various embodiments.
Figure 15:
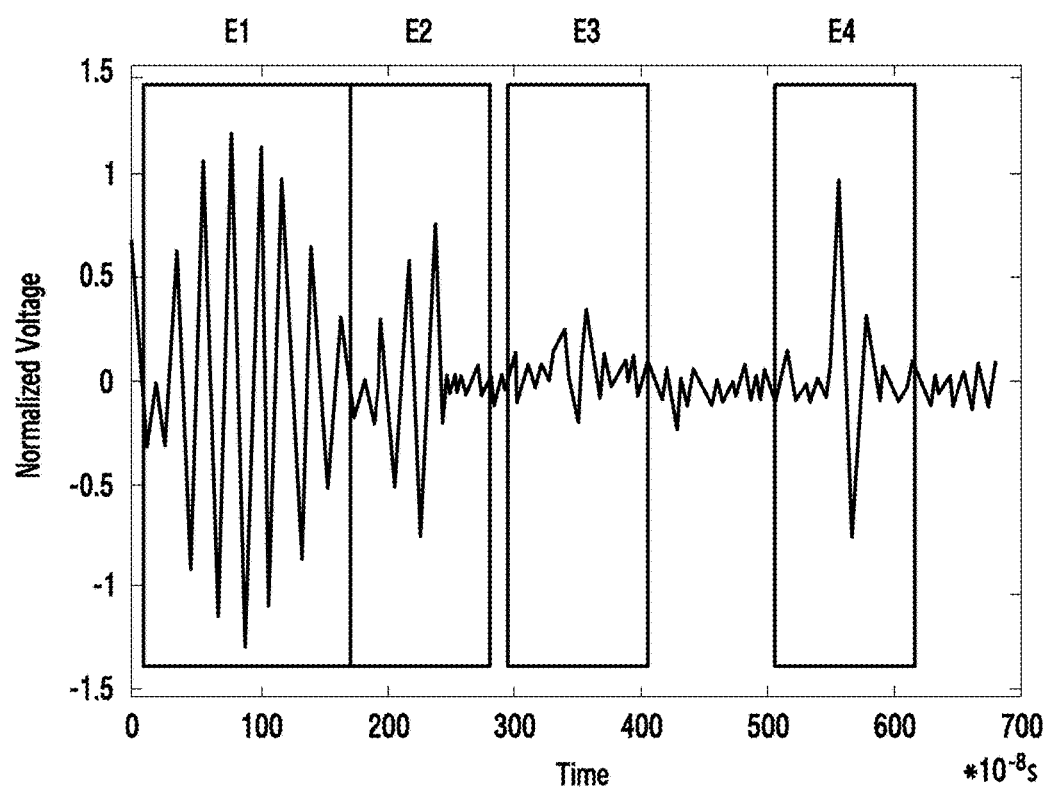
FIG. 15 is a diagram of an example of echo waveforms E1-E4 that are associated with a second point in a fingerprint, according to various embodiments.

FIG. 13 is a diagram illustrating an example in which a glove is sensed by a fingerprint sensor, according to various embodiments. FIG. 14 and FIG. 15 respectively illustrate several echo signals E1 to E4 received by the receiver (Rx) of a fingerprint sensor. FIG. 14 illustrates a waveform at a first point (e.g., P1) of the fingerprint, and FIG. 15 illustrates a waveform at a second point (e.g., P2). The echo signal may vary depending on a surface configuration of an electronic device. When various layers such as glass, plate, or the like are present on a surface of a fingerprint sensor, the echo signal reflected according to a medium difference is generated.

For example, E1 and E2 may be waves reflected from a fixed layer, and may be respectively observed at P1 (FIGS. 11) and P2 (FIG. 12) at the same time. For example, the fixed layer may be a window layer and an air gap. In addition, E3 is a reflected wave caused by an object, and may be observed at the same time at P1 (FIGS. 11) and P2 (FIG. 12). The fingerprint sensor according to various embodiments may be defined as a window, air gap, tissue, or the like that can be fixed on the basis of this structure of the electronic device until E1, E2, and E3, and an echo signal after E3 may have various waveforms depending on a type of an object. For example, the object may be a real finger, a fake finger, a real finger wearing a glove, or the like.

The electronic device according to various embodiments of the present disclosure may determine the type of the object by detecting whether to have the same level across several channels in E3. For example, if waveforms between E3 of P1 and E3 of P2 are identical or similar as shown in FIG. 13 and FIG. 14, the electronic device may detect that a surface of the object has a medium of a uniform shape, and determine that the object is a real finger wearing a glove.

As such, if each E3 has the same level, the electronic device may receive an echo signal (e.g., E4) after E3 by increasing strength of a transmitted signal of the fingerprint sensor. In addition, the electronic device may identify the received E4 as fingerprint information, and may perform a fingerprint recognition function by using E4. Upon collecting information of a level by which the fingerprint can be estimated from E4, the electronic device may recognize that a fingerprint is input in a state in which the finger wears the glove.

In various embodiments of the present disclosure, security can be improved by deciding a bio signal simultaneously in the fingerprint sensor. For example, if an output signal of an ultrasonic fingerprint sensor is high, the electronic device may measure a bloodstream inside a finger.

For example, a ridge/valley of the finger may be detected in E3, and a bloodstream flow of the finger may be identified in E4 or higher stages. If the ultrasonic fingerprint sensor is a Heart Rate (HR) sensor, the electronic device measures how frequently a bloodstream flows through reflection of a blood vessel of the finger, and thus measures a heart rate. Likewise, upon sensing the flow of the bloodstream from a specific echo signal through image processing, it may be identified as real bio fingerprint sensing information. However, if the heart rate is low to be less than or equal to a specific threshold or if the flow of the bloodstream is not sensed, the electronic device may identify this as a fake finger and thus may not perform authentication. Hereinafter, a structure of an electronic device capable of recognizing a fake fingerprint or a real finger wearing a (vinyl or leather) glove will be described on the basis of the aforementioned principle.

Figure 5:
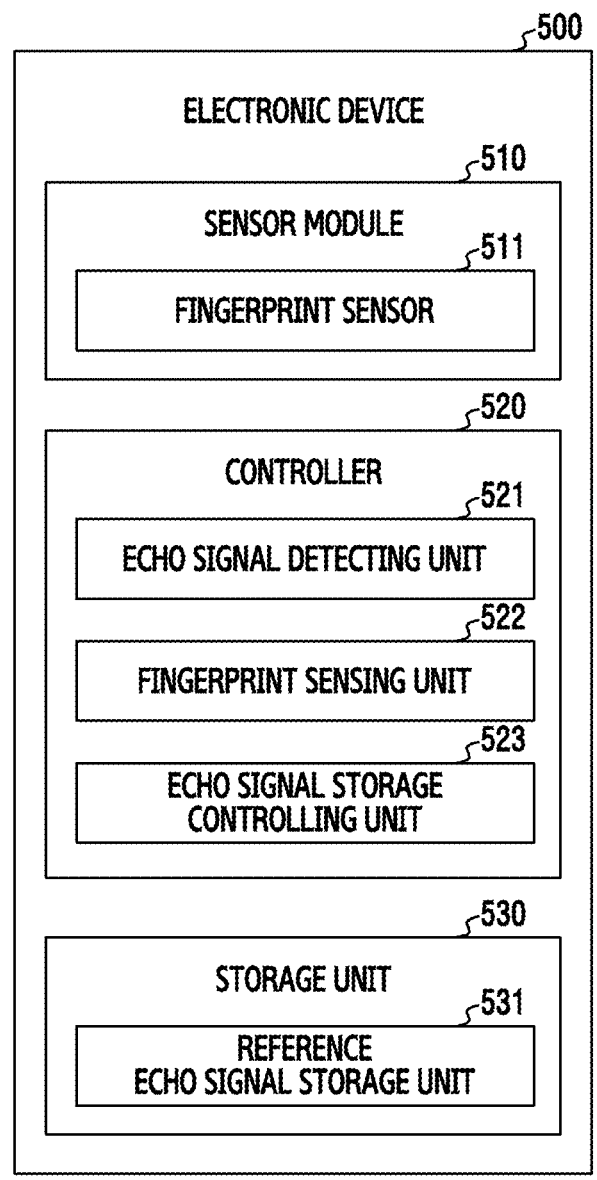
FIG. 5 is a block diagram of an example of an electronic device, according to various embodiments.

FIG. 5 is a block diagram of an example of an electronic device, according to various embodiments of the present disclosure.

Referring to FIG. 5, an electronic device 500 may include a sensor module 510, a processor 520, and a storage unit 530. In a certain exemplary embodiment, the electronic device 500 may omit at least one of components or may additionally include other components.

Each component will be described in detail. The sensor module 510 includes a fingerprint sensor 511, and the fingerprint sensor 511 may emit a sound wave (e.g., ultrasonic) signal towards an object, and may receive the sound wave signal reflected from the object. For example, the object may be any one of a finger of a user, a finger of a user who wears a glove, and a fake finger. For example, the fake finger may be any suitable type of object that is intended to mimic a real finger for the process of tricking the electronic device to recognize a counterfeit fingerprint (that may be embossed on the fake finger) as real. The fake finger may be formed of materials other than human tissue, such as plastic. In this case, the fingerprint sensor 511 may receive a plurality of sound wave signals reflected from the plurality of media for each of different times. Alternatively, the fingerprint sensor 511 may receive the sound wave signal reflected from a plurality of points of the object. For example, if the object is the finger of the user, the processor 520 may receive the sound wave signal reflected from a plurality of points of the finger. For example, the plurality of points may include a specific point that is considered optimal (or otherwise preferred) for fingerprint recognition.

The storage unit 530 includes a reference echo signal storage unit 531. The reference echo signal storage unit 531 may store at least one echo signal detected from the sound wave signal reflected from a reference object. For example, the storage unit 530 may store at least one echo signal for each reception time period. For another example, the storage unit 530 may store a plurality of wave sound signals corresponding to a plurality of points of the reference object. For example, the reference object may be a fake finger or a real finger of a user who does not wear a glove.

The processor 520 may receive a sound wave signal from the fingerprint sensor 511, may detect at least one echo signal related to a medium of an object distinctively for each reception time period from the received sound wave signal, and may detect the fingerprint on the basis of the at least one echo signal detected for each reception time period. For example, the processor 520 may include an echo signal detecting unit 521, a fingerprint sensing unit 522, and an echo signal storage controlling unit 523.

Each component will be described in detail. The echo signal detecting unit 521 may receive a sound wave signal from the fingerprint sensor 511, and may detect at least one echo signal related to a medium of an object distinctively for each reception time period from the received sound wave signal. For example, the echo signal may include a signal whose amplitude is greater than or equal to a specific magnitude as a signal for converting an ultrasonic signal reflected from various media into an electrical signal. For example, the echo signal may include signals E1, E2, E3, and E4.

For example, the echo signal detecting unit 521 may detect at least one echo signal for each reception time period from the received sound wave signal. For another example, the echo signal detecting unit 521 may detect a plurality of echo signals respectively from a plurality of sound wave signals corresponding to a plurality of points of an object.

As another example, when the plurality of echo signals is detected respectively from the plurality of sound wave signals, the echo signal detecting unit 521 may select and detect the plurality of echo signals respectively from the plurality of sound wave signals for each of identical reception time periods. For example, the echo signal detecting unit 521 may compare the plurality of echo signals respectively for a plurality of points to select one echo signal corresponding to the same reception time period.

If the object is a reference object, the echo signal detecting unit 521 may detect at least one echo signal related to a medium of the reference object, and thereafter may transmit the detected signal to the echo signal storage controlling unit 523.

The echo signal storage controlling unit 523 may be configured to receive at least one echo signal related to a medium of a reference object from the echo signal detecting unit 521 and to store the at least one echo signal received as a reference echo signal in the reference echo signal storage unit 531 distinctively for each reception time period.

The fingerprint sensing unit 522 may compare the detected at least one echo signal and the reference echo signal stored in the reference echo signal storage unit 531 for each of the identical reception time periods.

If the comparison result shows that the detected echo signal does not include an additional echo signal, the fingerprint sensing unit 522 may detect that a normal state is reached. For example, the normal state may be a state in which fingerprint sensing is possible (e.g., when the user is attempting to authenticate his or her fingerprint without wearing a glove or using a fake finger). In addition, the fingerprint sensing unit 522 may perform the fingerprint sensing on the basis of the detected at least one echo signal. For example, if the at least one echo signal is signals E1, E2, and E3, the fingerprint sensing unit 522 may image the signal E3 to pattern a fingerprint shape.

If the comparison result shows that the detected echo signal includes an additional echo signal at a specific reception time period, the fingerprint sensing unit 522 may detect that an abnormal state is reached. For example, the additional echo signal may be an echo signal not included in a reference echo signal among the detected at least one echo signal. In addition, the abnormal state may be a state in which fingerprint sensing is impossible due to a defect in an object.

In addition, according to one exemplary embodiment, the fingerprint sensing unit 522 may perform the fingerprint sensing on the basis of the additional echo signal. For example, if the additional echo signal is the signal E4, the fingerprint sensing unit 522 may image the signal E4 to pattern a fingerprint shape.

Further, according to another exemplary embodiment, the fingerprint sensing unit 522 may compare values of a plurality of points corresponding to the additional echo signal with each other, may identify a type of the abnormal state on the basis of the comparison result, and may perform the fingerprint sensing according to the identified type of the abnormal state. For example, the values of the plurality of points may be times at which sound wave signals corresponding to the plurality of points are generated.

More specifically, the fingerprint sensing unit 522 may compare the values of the plurality of points corresponding to the additional echo signals.

For example, the signal E3 and the signal E4 may be echo signals reflected from different media constituting the object. If the object is the real finger not wearing the glove, the signal E3 may be information regarding a finger surface, e.g., a fingerprint, and the signal E4 may be information regarding a tissue, e.g., a blood, a blood vessel, or the like, inside a finger. In this case, values of a plurality of points corresponding to the signal E4 may be different from each other.

If the object is the fake finger, the signal E3 may be information regarding the finger surface, and the signal E4 may be information regarding a material, e.g., plastic or the like, inside the finger. In this case, the values of the plurality of points corresponding to the signal E4 may be identical to each other.

Unlike this, if the object is the real finger wearing the glove, the signal E3 may be information regarding the glove, the signal E4 may be information regarding a finger surface, and the signal E5 may be information regarding a finger tissue. In this case, values of a plurality of points corresponding to the signal E5 may be different from each other.

For example, if the fingerprint sensor 511 has a pixel structure of 100×100, coordinates of the respective pixels may be designated as (1,1), (1,2), . . . , (1,100), (2,1), (2,2), . . . , (100,100). In this case, the fingerprint sensing unit 522 may process echo information individually for two pixels of (50,50) and (50,60). In this case, the pixel (50,50) may have the signal E3 and the signal E4 for each of different reception time periods, and the pixel (50,60) may also have the signal E3 and the signal E4 for each of the different time periods.

If the object is the finger not wearing the glove or the fake finger, since the signal E3 is information regarding the finger surface, a waveform of a sound wave for two pixels may be generated at the same value, e.g., 50 ns. If the object is the finger wearing the glove, since the signal E3 or the signal E4 is information regarding the glove or the finger surface, the two pixels may be located at the same value.

Meanwhile, if the object is the finger not wearing the glove, since the signal E4 is information regarding the finger tissue, a waveform of a sound wave regarding the pixel (50, 50) may be generated at 60 ns by being reflected from a capillary of the finger, and the waveform of the sound wave for the pixel (50,60) may be generated at 80 ns by being reflected from a bone of the finger.

If the object is the fake finger or the finger wearing the glove, since the signal E4 is information on materials inside the fake finger or information on a surface of the finger wearing the glove, a waveform of a sound wave for the pixel (50,50) may be generated at 75 ns, and a waveform of a sound wave for the pixel (50,60) may be generated at 75 ns. In this case, if the waveforms of two pixels for the signal E4 are generated at the same time, it may be shown that the same layer is formed in the object within a distance between the two pixels. If the waveforms of the sound waves for all pixels of a square area formed with the pixels (50,50) and (60,60) are generated at the same time, i.e., 75 ns, the fingerprint sensing unit 522 may detect that the object has a layer constructed of the same material inside thereof.

Meanwhile, if the object is the finger wearing the glove, since the signal E5 is information on the finger tissue, the waveform of the sound wave regarding the pixel (50,50) may be generated at 90 ns by being reflected from a capillary of the finger, and the waveform of the sound wave for the pixel (50,60) may be generated at 120 ns by being reflected from a bone of the finger.

By using such a characteristic, the fingerprint sensing unit 522 may compare the values of the plurality of points for the additional echo signal to estimate a type of the abnormal state. If the additional echo signal is plural in number, the values of the plurality of points for each echo signal may be compared. For example, in case of the signal E4 and the signal E5, the fingerprint sensing unit 522 may compare values of a plurality of points for the signal E4 and may compare values of a plurality of points for the signal E5.

In addition, the fingerprint sensing unit 522 may detect whether the values of the plurality of points for the additional echo signal are identical to each other on the basis of the comparison result. For example, if the values of the plurality of points are 90 ns and 120 ns, the fingerprint sensing unit 522 may determine that the values of the plurality of points are not identical to each other.

If it is detected that the values of the plurality of points are identical, the fingerprint sensing unit 522 may determine that the object is the fake finger and thereafter may end the finger recognition function. Unlike this, if the values of the plurality of points are not identical, the fingerprint sensing unit 522 may detect that the object is the real finger wearing the glove and may perform fingerprint sensing on the basis of the additional echo signal.

Hereinafter, a fingerprint recognition method in which a fingerprint sensor can recognize a fake fingerprint, a (plastic or leather) glove, or the like will be described on the basis of the aforementioned principle.

Figure 16:
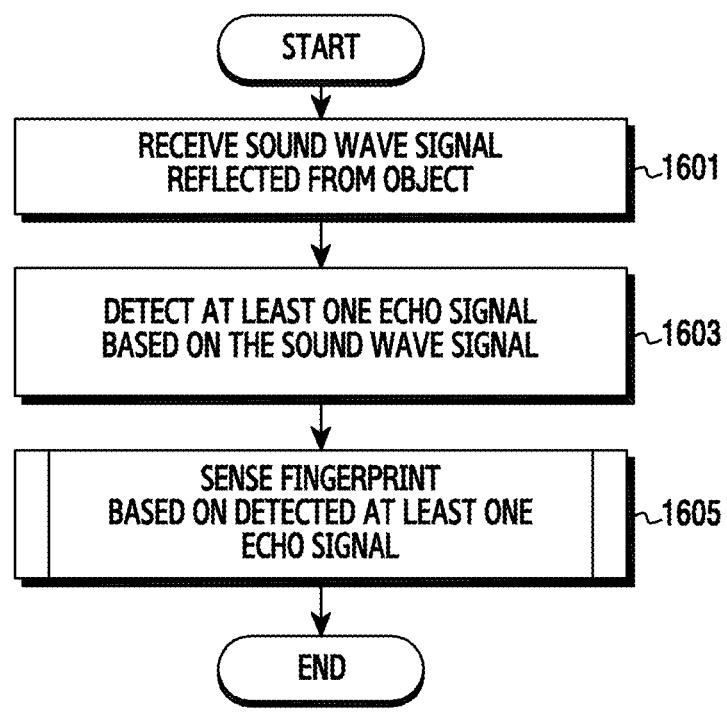
FIG. 16 is a flowchart of an example of a process, according to various embodiments.

FIG. 16 is a flowchart of an example of a process, according to various embodiments of the present disclosure.

Referring to FIG. 16, in operation 1601, the processor 520 may perform a fingerprint recognition function to activate the fingerprint sensor 511, may receive a sound wave signal reflected from an object through the fingerprint sensor 511, and thereafter may proceed to operation 1603. For example, when the fingerprint sensor 511 is in contact with the object, the processor 520 may perform the fingerprint recognition function. In the present example, the object may be any one of a finger of a user, a finger of a user who wears a glove, and a fake finger. The fake finger means a finger shape formed of materials (e.g., plastic) other than a cell.

For example, the fingerprint sensor 511 may be an ultrasonic sensor. For example, a sound wave signal may be at least one ultrasonic signal which is obtained when an ultrasonic signal transmitted from the fingerprint sensor 511 is reflected by colliding with at least one medium constituting an object. The sound wave signal is reflected by colliding with a plurality of media having various sound wave impedances. The fingerprint sensor 511 may receive a plurality of sound wave signals reflected from the plurality of media for each of different time periods.

In addition, the processor 520 may receive the sound wave signal reflected from a plurality of points of the object. For example, if the object is the finger of the user, the processor 520 may receive the sound wave signal reflected from a plurality of points of the finger. For example, the plurality of points may include a specific point that is considered optimal (or otherwise preferable) for fingerprint recognition.

In operation 1603, the processor 520 may detect at least one echo signal related to a medium of an object from the received sound wave signal, and thereafter may proceed to operation 1605. For example, the echo signal may be a signal whose amplitude is greater than or equal to a specific magnitude as a signal for converting an ultrasonic signal reflected from various media into an electrical signal. For example, the echo signal may be signals E1, E2, E3, and E4.

For example, the processor 520 may detect at least one echo signal for each reception time period from the received sound wave signal. For example, the processor 520 may receive the echo signals in order of E1, E2, E3, and E4 from the received sound wave signal.

For another example, the processor 520 may detect a plurality of echo signals respectively from a plurality of sound wave signals corresponding to a plurality of points of an object. For another example, when the plurality of echo signals are detected respectively from the plurality of sound wave signals, the processor 520 may select and detect the plurality of echo signals respectively from the plurality of sound wave signals for each of identical reception time periods. For example, the processor 520 may compare the plurality of echo signals respectively for a plurality of points to select one echo signal corresponding to the same reception time period.

In operation 1605, the processor 520 may perform fingerprint sensing on the basis of the detected at least one echo signal.

For example, if the detected at least one echo signal is the signals E1, E2, E3, and E4, the processor 520 may image the signal E3 to pattern a fingerprint shape. Now, the operation 1605 will be described in detail with reference to FIG. 17 and FIG. 18. For another example, the processor 520 may perform fingerprint sensing on the basis of at least one echo signal received during a pre-set time period. For example, the pre-set time period may be determined by considering a reception time period of the signal E3 or the signal E5.

Figure 17:
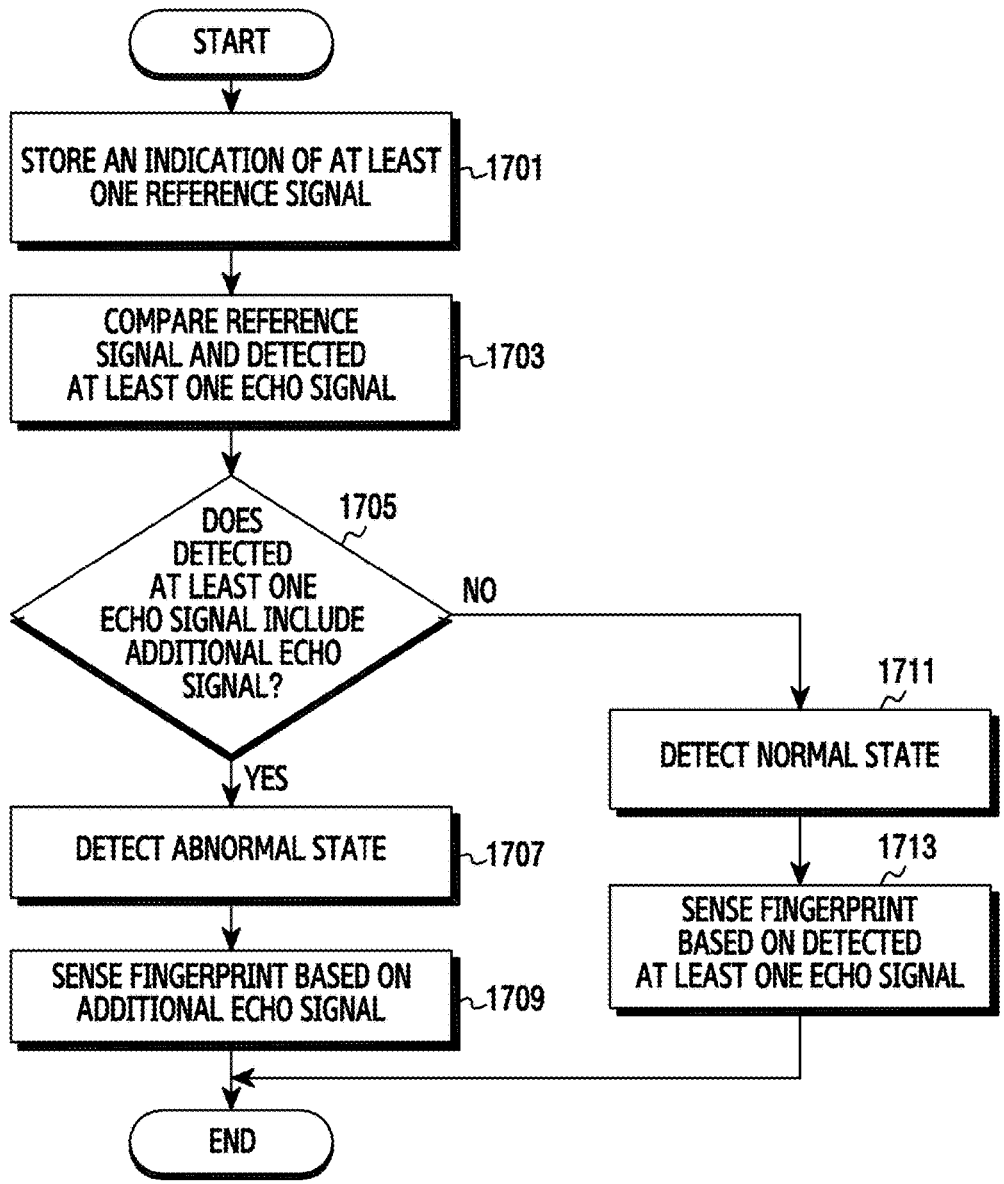
FIG. 17 is a flowchart of an example of a process, according to various embodiments.

FIG. 17 is a flowchart of an example of a process, according to various embodiments of the present disclosure.

Referring to FIG. 17, in operation 1701, the processor 520 may store at least one echo signal detected from a sound wave signal reflected from a reference object as a reference echo signal, and thereafter may proceed to operation 1703. In this case, the processor 520 may store at least one echo signal for each reception time period. Alternatively, the processor 520 may store a plurality of sound wave signals corresponding to a plurality of points of the reference object. For example, the reference object may be a fake finger or a real finger of a user who does not wear a glove. If the reference echo signal is stored in a memory, the processor 520 may omit this operation and may proceed to a next operation.

In operation 1703, the processor 520 may compare the reference echo signal and the detected at least one echo signal, and thereafter may proceed to operation 1705. For example, the processor 520 may compare the reference echo signal and at least one echo signal for each of identical reception time periods.

In operation 1705, the processor 520 may detect whether at least one echo signal detected on the basis of the comparison result includes an additional echo signal. For example, the additional echo signal may be an echo signal not included in a reference echo signal among the detected at least one echo signal. For example, if the reference echo signal is constructed of the E1 signal, the E2 signal, and the signal E3 and if the detected at least one echo signal is constructed of the E1 signal, the E2 signal, the signal E3, and the signal E4, the processor 520 may determine that the detected at least one echo signal includes the additional echo signal since the detected at least one echo signal further includes the signal E4 in comparison with the reference echo signal. In this case, the signal E4 may be the additional echo signal.

If it is detected that the detected at least one echo signal includes the additional echo signal, the processor 520 proceeds to operation 1707, and otherwise may proceed to operation 1711.

In case of proceeding to operation 1707, the processor 520 may that an abnormal state is reached, and thereafter may proceed to operation 1709. For example, the abnormal state may be a state in which fingerprint sensing is impossible due to a defect in the object that is being fingerprinted. In some instances, the defect may occur when the user attempts to fingerprint a fake finger or when the user is wearing a glove while having his fingerprint taken.

In operation 1709, the processor 520 may perform the fingerprint sensing on the basis of the additional echo signal. For example, if the additional echo signal is the signal E4, the processor 520 may image the signal E4 to pattern a fingerprint shape.

In case of proceeding to operation 1711, the processor 520 may detect that that a normal state is reached, and thereafter may proceed to operation 1713. For example, the normal state may be a state in which fingerprint sensing is possible (e.g., when the user is not attempting to fingerprint a fake finger and/or when the user is not wearing a glove when his or her fingerprint is taken).

In operation 1713, the processor 520 may perform the fingerprint sensing on the basis of the detected at least one echo signal. For example, if the at least one echo signal is signals E1, E2, and E3, the processor 520 may image the signal E3 to pattern a fingerprint shape.

Figure 18:
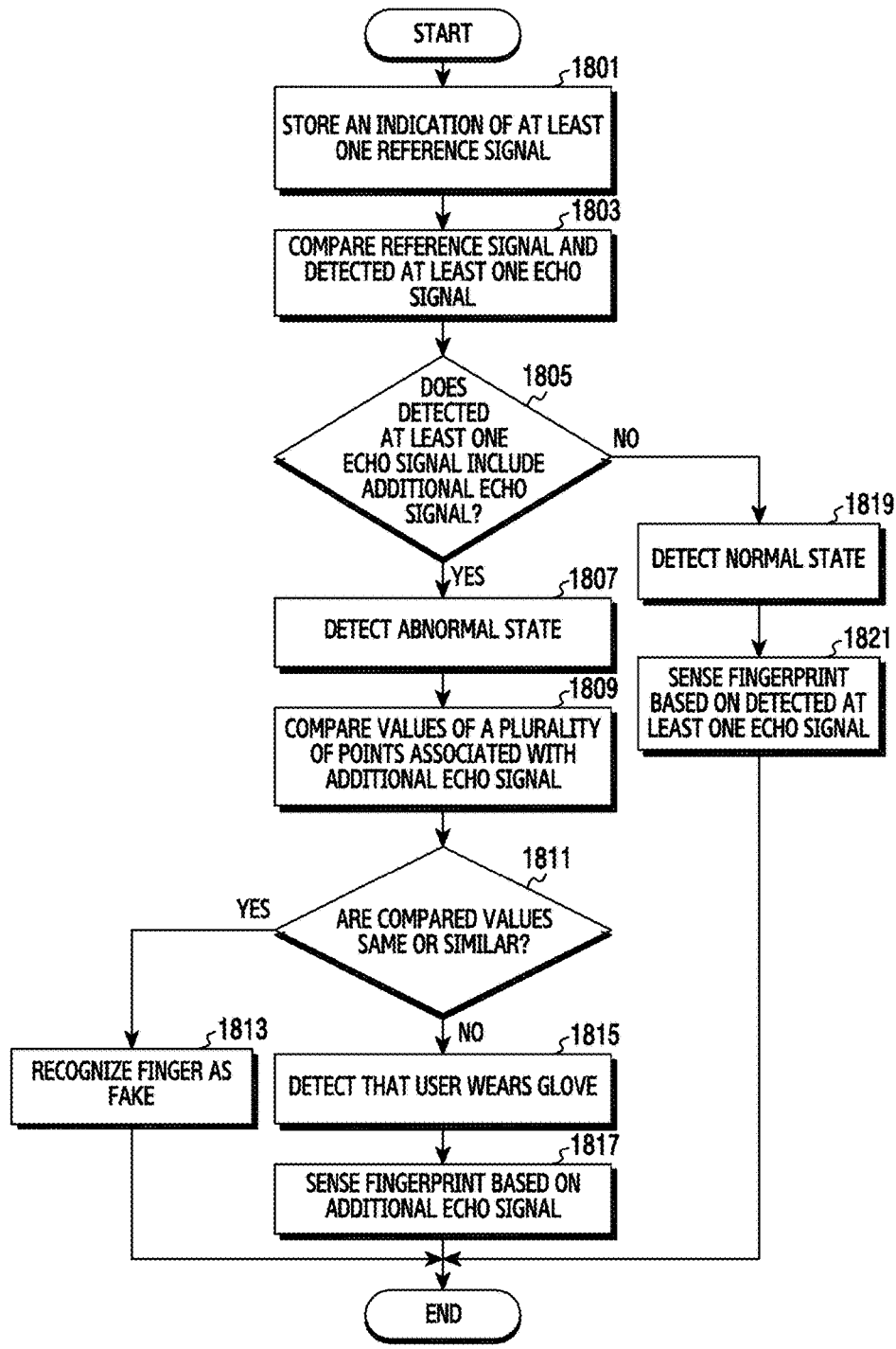
FIG. 18 is a flowchart of an example of a process, according to various embodiments.

FIG. 18 is as flowchart of an example of a process, according to various embodiments of the present disclosure.

Referring to FIG. 18, in operation 1801, the processor 520 may store at least one echo signal detected from a sound wave signal reflected from a reference object as a reference echo signal, and thereafter may proceed to operation 1803. In this case, the processor 520 may store at least one echo signal for each reception time period. Alternatively, the processor 520 may store a plurality of sound wave signals corresponding to a plurality of points of the reference object. For example, the reference object may be a fake finger or a real finger of a user who does not wear a glove. If the reference echo signal is stored in a memory, the processor 520 may omit this operation and may proceed to a next operation.

In operation 1803, the processor 520 may compare the reference echo signal and the detected at least one echo signal, and thereafter may proceed to operation 1805. For example, the processor 520 may compare the reference echo signal and at least one echo signal for each of identical reception time periods.

In operation 1805, the processor 520 may detect whether at least one echo signal detected on the basis of the comparison result includes an additional echo signal. For example, the additional echo signal may be an echo signal not included in a reference echo signal among the detected at least one echo signal. For example, if the reference echo signal is constructed of the E1 signal, the E2 signal, and the signal E3 and if the detected at least one echo signal is constructed of the E1 signal, the E2 signal, the signal E3, and the signal E4, the processor 520 may determine that the detected at least one echo signal includes the additional echo signal since the detected at least one echo signal further includes the signal E4 in comparison with the reference echo signal. In this case, the signal E4 may be the additional echo signal.

If it is detected that the detected at least one echo signal includes the additional echo signal, the processor 520 proceeds to operation 1807, and otherwise may proceed to operation 1819.

In case of proceeding to operation 1807, the processor 520 may detect that an abnormal state is reached, and thereafter may proceed to operation 1809. As noted above, the abnormal state may be a state in which fingerprint sensing is impossible due to a defect of an object.

In operation 1809, the processor 520 may compare values of a plurality of points corresponding to the additional echo signal with each other, and thereafter may proceed to operation 1811. For example, the values of the plurality of points may be times at which sound wave signals corresponding to the plurality of points are generated.

In operation 1811, the processor 520 may detect whether the values of the plurality of points for the additional echo signal are identical to each other on the basis of the comparison result. For example, if the values of the plurality of points are 90 ns and 120 ns, the processor 520 may determine that the values of the plurality of points are not identical to each other.

If it is detected that the values of the plurality of points are identical, the processor 520 may proceed to operation 1813, and otherwise may proceed to operation 1815.

In case of proceeding to operation 1813, the processor 520 may determine that the object is the fake finger and thereafter may end the finger recognition function. For example, the processor 520 may output a message for allowing another object to be in contact with a fingerprint sensor in a format of an image, a text, or an image, and thereafter may end the fingerprint recognition function.

In case of proceeding to operation 1815, the processor 520 may detect that the object is a real finger wearing a glove, and thereafter may proceed to operation 1817. In operation 1817, the processor 520 may perform fingerprint sensing on the basis of an additional echo signal. For example, the processor 520 may perform the fingerprint sensing on the basis of the signal E4 which is information on a surface of the finger wearing the glove. In case of proceeding to operation 1819, the processor 520 may detect that a normal state is reached, and thereafter may proceed to operation 1821. As noted above, the normal state may be a state in which fingerprint sensing is possible.

In operation 1821, the processor 520 may perform the fingerprint sensing on the basis of the detected at least one echo signal. For example, if the at least one echo signal is the signals E1, E2, E3, and E4, the processor 520 may image the signal E3, which is information on a surface of the real finger not wearing the glove, to pattern a fingerprint shape.

Various embodiments of the present disclosure can detect a counterfeit fingerprint to achieve anti-spoofing, and can perform user authentication in a state of wearing medical gloves or gloves used in industrial semiconductor manufacturing. The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an application-specific integrated circuit (ASIC) chip, a field-programmable gate arrays (FPGAs), and a programmable-logic device for performing operations which has been known or are to be developed hereinafter.

At least some of the devices (e.g., modules or functions thereof) or the method (e.g., operations) according to various embodiments may be implemented by, for example, a command stored in a computer-readable storage medium in a programming module form. The instruction, when executed by a processor (e.g., the processor 120), may cause the one or more processors to execute the function corresponding to the instruction. The computer-readable storage medium may be, for example, the memory 130.

FIGS. 1-18 are provided as an example only. At least some of the operations discussed with respect to these figures can be performed concurrently, performed in different order, and/or altogether omitted. According to aspects of the disclosure two echo signals may be considered same or similar if they are identical to each other and/or satisfy a predetermined matching criterion. It will be understood that the provision of the examples described herein, as well as clauses phrased as "such as," "e.g.", "including", "in some aspects," "in some implementations," and the like should not be interpreted as limiting the claimed subject matter to the specific examples.

The above-described aspects of the present disclosure can be implemented in hardware, firmware or via the execution of software or computer code that can be stored in a recording medium such as a CD-ROM, a Digital Versatile Disc (DVD), a magnetic tape, a RAM, a floppy disk, a hard disk, or a magneto-optical disk or computer code downloaded over a network originally stored on a remote recording medium or a non-transitory machine-readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

Moreover, the embodiments disclosed in this specification are suggested for the description and understanding of technical content but do not limit the range of the present disclosure. Accordingly, the range of the present disclosure should be interpreted as including all modifications or various other embodiments based on the technical idea of the present disclosure.

What is claimed is:

1. A method for sensing a fingerprint in an electronic device, comprising:
   receiving a first sound wave signal reflected from a first point of an object and a second sound wave signal reflected from a second point of the object, wherein the first sound wave signal and the second sound wave signal comprises respectively a plurality of echo signals whose amplitude are greater than a first reference value, wherein the plurality of echo signals are ordered by time intervals in which the plurality of echo signals are detected;
   detecting a first echo signal from the first sound wave signal and a second echo signal from the second sound wave signal, wherein the first and second echo signals are generated due to a change in medium for the first and second sound wave signals, wherein the first echo signal is detected in a first time interval, nth in the first sound wave signal, and the second echo signal is detected in a second time interval, nth in the second sound wave signal;
   detecting the fingerprint based on the first and second echo signals; and
   determining that the object is a real finger when the first time interval is deviated from the second time interval by more than a second reference value.

2. The method of claim 1, further comprising:
   detecting a third echo signal from the first sound wave signal and a fourth echo signal from the second sound wave signal; and
   determining that the object is a real finger wearing a glove when the third echo signal has a substantially same waveform as the fourth echo signal.

3. The method of claim 1, further comprising:
   retrieving a reference signal; and
   comparing the first and second echo signals to the reference signal.

4. The method of claim 3, further comprising storing the reference signal in a memory, wherein the storing of the reference signal is performed for each sound wave signal.

5. The method of claim 3, further comprising detecting an abnormal state when the first echo signal or the second echo signal includes an additional echo signal that does not have a corresponding echo signal in the reference signal.

6. The method of claim 5, wherein the fingerprint is detected further based on the additional echo signal when the abnormal state is detected.

7. The method of claim 5, wherein the additional echo signal is detected for each point of the object.

8. The method of claim 7, further comprising identifying a type of the abnormal state according to whether the additional echo signal in the first echo signal is same as or similar to the additional echo signal in the second echo signal.

9. The method of claim 1, wherein the first and second echo signals are detected based on a pre-set reception time period.

10. An apparatus for sensing a fingerprint electronic device comprising:
    a fingerprint sensor;
    memory; and
    at least one processor operatively coupled to the memory, configured to:
    receive a first sound wave signal reflected from a first point of an object and a second sound wave signal reflected from a second point of the object, wherein the first sound wave signal and the second sound wave signal comprises respectively a plurality of echo signals whose amplitude are greater than a first reference value, wherein the plurality of echo signals are ordered by time intervals in which the plurality of echo signals are detected;
    detect a first echo signal from the first sound wave signal and a second echo signal from the second sound wave signal, wherein the first and second echo signals are generated due to a change in medium for the first and second sound wave signals, wherein the first echo signal is detected in a first time interval, nth in the first sound wave signal, and the second echo signal is detected in a second time interval, nth in the second sound wave signal;
    detect the fingerprint based on the first and second echo signals; and
    determine that the object is a real finger when the first time interval is deviated from the second time interval by more than a reference value.

11. The apparatus of claim 10, wherein the at least one processor is further configured to:
    detect a third echo signal from the first sound wave signal and a fourth echo signal from the second sound wave signal; and
    determine that the object is a real finger wearing a glove when the third echo signal has a substantially same waveform as the fourth echo signal.

12. The apparatus of claim 10, wherein the at least one processor is further configured to:
    retrieve a reference signal, and
    compare the first and second echo signals to the reference signal.

13. The apparatus of claim 12, wherein the at least one processor is further configured to store the reference signal in the memory for each sound wave signal.

14. The apparatus of claim 12, wherein the at least one processor is further configured to detect an abnormal state when the first echo signal or the second echo signal includes an additional echo signal that does not have a corresponding echo signal in the reference signal.

15. The apparatus of claim 14, wherein the fingerprint is detected further based on the additional echo signal when the abnormal state is detected.

16. The apparatus of claim 14, wherein the additional echo signal is detected for each point of the object.

17. The apparatus of claim 16, wherein the at least one processor is further configured to identify a type of the abnormal state according to whether the additional echo signal in the first echo signal is same as or similar to the additional echo signal in the second echo signal.

18. The apparatus of claim 10, wherein the first and second echo signals are detected based on a pre-set reception time period.

* * * * *